United States Patent
Sugimoto et al.

(10) Patent No.: US 8,802,170 B2
(45) Date of Patent: Aug. 12, 2014

(54) METHOD OF MANUFACTURING LIQUID KOJI

(75) Inventors: Toshikazu Sugimoto, Moriya (JP); Hiroshi Shoji, Moriya (JP)

(73) Assignee: Asahi Breweries, Ltd., Tokyo (JP)

( * ) Notice: Subject to any disclaimer, the term of this patent is extended or adjusted under 35 U.S.C. 154(b) by 1137 days.

(21) Appl. No.: 11/547,809

(22) PCT Filed: Mar. 24, 2005

(86) PCT No.: PCT/JP2005/005336
§ 371 (c)(1), (2), (4) Date: Oct. 6, 2006

(87) PCT Pub. No.: WO2005/097967
PCT Pub. Date: Oct. 20, 2005

(65) Prior Publication Data
US 2007/0207238 A1 Sep. 6, 2007

(30) Foreign Application Priority Data

Apr. 9, 2004 (JP) ................................ 2004-115904
Dec. 3, 2004 (JP) ................................ 2004-350661
Dec. 6, 2004 (JP) ................................ 2004-352320
Dec. 6, 2004 (JP) ................................ 2004-352324
Dec. 28, 2004 (JP) ................................ 2004-378453

(51) Int. Cl.
*A23L 1/20* (2006.01)

(52) U.S. Cl.
USPC ................ 426/46; 426/49; 426/52; 426/11; 426/18; 426/28; 426/29; 426/590; 426/592

(58) Field of Classification Search
USPC ............. 426/11, 18, 28, 29, 590, 592, 46, 49
See application file for complete search history.

(56) References Cited

U.S. PATENT DOCUMENTS

| 4,358,462 A | 11/1982 | Takeda |
| 6,667,066 B2 | 12/2003 | Labeille et al. |
| 6,843,994 B2 | 1/2005 | Iwasaki |

FOREIGN PATENT DOCUMENTS

| EP | 1908818 | 4/2008 |
| JP | 59-140872 | 8/1984 |

(Continued)

OTHER PUBLICATIONS

Yoshizo Sotoike, "Sake no Jiten", Tokyodo Shuppan, Jun. 25, 1975, p. 79.

(Continued)

*Primary Examiner* — Vera Stulii
(74) *Attorney, Agent, or Firm* — Antonelli, Terry, Stout & Kraus, LLP.

(57) ABSTRACT

An object of the present invention is to provide a liquid koji to be used in the production of a fermented food or drink, particularly a liquid koji having glucoamylase and acid-stable α-amylase with high enzymatic activities, which can be used in the brewing of shochu. The present invention provides a method of manufacturing a liquid koji to be used in production of a fermented food or drink, comprising: cultivating a koji mold in a liquid medium that contains, as a raw material, a substance selected from the group consisting of a cereal having a surface covered with a husk; a cereal having a surface from which only a husk (e.g., a chaff) is removed; an unprocessed bean or tuber having a surface covered with a hull; and *amaranthus* and/or quinoa. According to the present invention, both enzymes of glucoamylase and acid-stable α-amylase are simultaneously produced with high yield in a balanced manner to allow the production of a liquid koji having enzymatic activities required for, for example, the brewing of shochu. By using the liquid koji, fermented foods and drinks such as shochu can be efficiently produced.

16 Claims, 5 Drawing Sheets

(56) References Cited

FOREIGN PATENT DOCUMENTS

| | | |
|---|---|---|
| JP | 61-293380 | 12/1986 |
| JP | 03-247265 | 11/1991 |
| JP | 07-177884 | 7/1995 |
| JP | 08-23955 | 1/1996 |
| JP | 10-204494 | 8/1998 |
| JP | 11-225746 | 8/1999 |
| JP | 2001-321154 | 11/2001 |
| JP | 2003-047455 * | 2/2003 |
| JP | 2003-265165 | 9/2003 |
| JP | 2004-242532 | 9/2004 |
| JP | 2004-267065 | 9/2004 |
| JP | 2004-290155 | 10/2004 |
| JP | 2005-295871 | 10/2005 |
| JP | 2005-295873 | 10/2005 |
| WO | WO 2007/039990 | 4/2007 |

OTHER PUBLICATIONS

Supplementary European Search Report dated Apr. 17, 2008, for Application No. EP 05 72 7125.
T. Akao, et al., "*Aspergillus kawachii* no Shinto Baiyoeki ni yoru Honkakushochu Seizo/Honkaku-Shochu Production Using Shaking Cultured Medium of *Aspergillus Kawachii*", Journal of Brewing Society of Japan, vol. 89, No. 11, 1994, pp. 913 and 914. (XP003010823).
A. Blandino, et al., "Utilisation of whole wheat flour for the production of extracellular pectinases by some fungal strains", Process Biochemistry, vol. 37, No. 5, Dec. 20, 2001, pp. 497-503. (XP003007639).
K. Iwano, et al., "Influence of the variety of rice and polishing rate of Japanese sake koji making" Journal of Brewing Society of Japan, vol. 99, No. 1, Jan. 2004, pp. 55-63. (XP003010820).
R. Morkeberg, et al., "Induction and repression of a-amylase production in batch and continuous cultures of *Aspergillus oryzae*", Microbiology, vol. 141, No. Part 10, Oct. 1995, pp. 2449-2454. (XP003010822).
Mariani DD. et al., "Influence of amaranth on the production of alpha-amylase using *Aspergillus neger* NRRL 3112", Rev. Argent Microbiol., vol. 32, No. 4, 2000, pp. 185-189, abstract.
Viswanathan, et al., "Production of alpha-amylase with *Aspergillus flavus* on Amaranthus grains by solid-state fermentation", J.Basic Microb.Technol., vol. 41, No. 1, 2001, pp. 57-64.
Reddy, et al., "Glucose feedback inhibition of amylase activity in *Aspergillus* sp. and release of this inhibition when coculttured with *Saccharomyces cerevisiae*", Enzyme Microbe.Technol., vol. 8, pp. 659-664, 1986.
T. Akao, et al., "Honkaku-shochu Production Using Shaking Cultured Medium of *Aspergillus* Kawachii", J. Brew. Soc., vol. 89, No. 11 (1994), pp. 913 and 914. (XP003010823).
A. Bandino, et al., "Utilisation of whole wheat flour for the production of extracellular pectinases by some fungal strains", Process Biochemistry, vol. 37, No. 5 (Dec. 20, 2001), pp. 497-503. (XP003007639).
K. Iwano, et al., "Influence of the variety of rice and polishing rate on Japanese sake koji making", J. Brew. Soc. Japan, vol. 99, No. 1 (2004), pp. 55-63.
D. D. Mariani, et al., "Influence of amaranth on the production of alpha-amylase using *Aspergillus neger* NRRL 3112", Rev. Argent Microbiol, vol. 32, No. 4 (2000), 185-189.
R. Morkeberg, et al., "Induction and repression of α-amylase production in batch and continuous cultures of *Aspergillus oryzae*", Microbiology, vol. 141, Part 10 (1995), pp. 2449-2454. (XP003010822).
C. A. Reddy, et al., Glucose feedback inhibition of amylase activity in *Aspergillus* sp. and release of this inhibition when cocultured with *Saccharomyces cerevisiae*, Enzyme Microbe. Technol., vol. 8 (Nov. 1986), pp. 659-664.
Y. Sotoike, "Sake no Jiten", Tokyodo Shuppan, Jun. 25, 1975, p. 79.
P. Viswanathan, et al., "Production of α-amylase with *Aspergillus flavus* on Amaranthus grains by solid-state fermentation", J. Basic Microb. Technol., vol. 41, No. 1 (2001), pp. 57-64.
Annual Report of Food Research Institute, Aichi Prefectural Government, The 42$^{nd}$ Issue (2001).
S. Sudo, "Characteristics of Acid-stable α-Amylase Production by *Aspergillus kawachii*", J. Brew. Soc. Japan, vol. 89 (1994), pp. 768-774.
H. Fukuda, et al., "Improvement of Material Utilization in Sake Moromi Brewing by Addition of Cell Wall Macerating Enzymes—Note—", 2001, pp. 299-302. (XP003007305).
H. Fukuda, et al., "Improvement of Material Utilization in Sake Moromi Brewing by addition of Cell Wall Macerating Enzymes", J. Brew. Soc. Japan, vol. 97, No. 12 (2002), pp. 808-813.
D. V. Gokhale, et al., "Optimization of Cellulase Production by *Aspergillus niger* NCIM 1207", Appl. Biochem Biotechnol., vol. 30, No. 1 (1991), pp. 99-109.
M. Goto, "Digestion of raw starch by glucoamylase I from *Aspergillus awamori* var. *kawachii*", Bioscience & Industry, vol. 59, No. 3 (2001), pp. 183 and 184.
W. P. Hammes, et al., "Microbial ecology of cereal fermentations", Trends in Food Science & Technol., vol. 16 (2005), pp. 4-11.
Y. Hata, et. al., "Glucoamylase-Encoding Genes of *Aspergillus oryzae*—Monograph-", J. Soc. Biotechnol. Japan, vol. 78, No. 4 (2000), pp. 120-127.
K. Ito, "Progress of *Aspergillus* Mold Study: Molecular Genetic Analysis of Shochu Koji Molds", J. Brew. Soc., T. Japan, vol. 95, No. 9 (2000), pp. 635-640.
K. Iwano, et al., "Influence of Cultural Conditions on Various Enzyme Activities of Shochu Koji" J. Brew. Soc. Japan, vol. 82, No. 3 (1987), pp. 200-204.
K. Kainuma, "Special-Brewing and Synthesis—Enzymes to Degrade Raw Starch", Kobunshi, vol. 35, No. 6 (1986), p. 564.
T. Kato, et al., "Analysis of the unique expression mode of acid-unstable α-amylase from *Aspergillus kawachii*", J. Brew. Soc. Japan, vol. 100, No. 7 (2005), pp. 513-519.
A. Kawato, et al., "High Production Mechanism of Glucoamylases in Solid Malt", J. Fushimi Joyu-kai, vol. 13 (1998), pp. 15-25.
Y. Koba, et al., "Preparation of Koji from Corn Hulls for Alcoholic Fermentation without Cooking", J. Fement Technol., vol. 64, No. 2 (1986), pp. 175-178.
S. Masuda, et al., "Analysis of Enzyme Production by Submerged Culture of *Aspergillus oryzae* Using Whole Barley", Bioscience, Biotechnology and Biochemistry, vol. 73, No. 10 (Oct. 2009), pp. 2190-2195. (XP002556619).
H. Narahara, et al., "Study on Production of Rice Koji (The Second Report) Influence Factor on Enzyme Production of *Aspergillus oryzae*", Miso Science and Technology, vol. 31, No. 9 (1983), pp. 358-363.
W. Nomachi, et al. "Molecular Breeding of *Aspergillus kawachii* Overproducing Cellulase and its Application to Brewing Barley Shochu", J. Bioscience and Bioengineering, vol. 93, No. 4 (2002), pp. 382-387.
M. Sato, et al., "The Effect of Polishing Rate of Rice on the Quality of Koji and Miso", Report of the Shinshu-Miso Research Institute, 1989. (XP008115212).
S. Shibata, et al., "Knowledge of Flours" (Revised and enlarged edition), Saiwai Shobo K.K. (2000), pp. 72 and 73.
M. Shimoda, et al., "Characteristics of Water Uptake of Australian Polished Barley in Shochu-Making", J. Inst. Brew., vol. 104 (1998), pp. 33-35.
H. Shoji, et al., "Analysis of the Factor That Affect the Productivity of the Enzyme Contained in the Submerged Culture of *Apergillus Kawachii* Using Whole Barley", The Society for Bioltechnology Taikai Koen Yoshishu, vol. 58 (Aug. 3, 2006), p. 68.
H. Shoji, et al., "Simultaneous Production of Glucoamylase and Acid-Stable alpha-Amylase Using Novel Submerged Culture of *Aspergillus kawachii* NBRC4308", J. Bioscience and Bioengineering, vol. 103, No. 2 (Feb. 1, 2007), pp. 203-205.
K. R. Sreekantiah, et al., "Effekt of Cultural and Nutritional Variations on Certain Exo-Enzymes Secreted by Fungi", Chem. Mikrobiol. Technol. Lebensm, vol. 2, No. 2 (1973), pp. 42-48.

(56) References Cited

OTHER PUBLICATIONS

S. Sudo, et al., "Comparison of Acid-Stable α-Amylase Production by *Aspergillus kawachii* in Solid-State and Submerged Cultures", *J. Fermen. and Bioengineer.*, vol. 77, No. 5 (Jan. 1994), pp. 483-489.

S. Sudo, "Characteristics of Acid-Stable Alpha Amylase Production by *Aspergillus kawachii*" *J. Brew. Soc. Japan*, vol. 89, No. 10 (1994), pp. 768-774.

T. Sugimoto, et al., "Enzyme Production of *Aspergillus kawachii* in Submerged Cultivation Using Original Barley", *The Society for Biotechnology Taikai Koen Yoshishu*, vol. 58 (Aug. 3, 2006), p. 69.

Y. Teramoto, et al., "Thai ou-Characteristics of a traditional Thai alcoholic beverage drunk with a straw", *The Brewer International*, vol. 2, No. 7 (2002), pp. 31 and 32.

H. Tokuda, et al., "Hydrolysis of Raw Starch with Immobolized Mycelia", *The Society for Biotechnology: Japan Taikai Koen Yoshisu*, vol. 1996 (1996), p. 69.

R. Tonoike, Dictionary of Llquour, Tokyodo Syuppan K.K., (1980), pp. 79-81.

K. Tsuchiya, et al., "High Level Secretion of Calf Chymosin Using a Glucoamylase-prochymosin Fusion Gene in *Aspergillus oryzae*", *Biosci. Biotech. Biochem.*, vol. 58, No. 5 (1994), pp. 895-899.

H. Wadaka, et. al., "Preparation of Submerged Mold Culture Fluid for Rice Vinegar Mash", vol. 15 (Jan. 1, 1980), pp. 13-19. (XP003007640).

R. Wang, et al., "Protease production and conidiation by *Aspergillus oryzae* in flour fermentation", *Process Biochemistry*, vol. 40, No. 1 (Jan. 1, 2005), pp. 217-227.

\* cited by examiner

METHOD OF MANUFACTURING LIQUID KOJI

TECHNICAL FIELD

The present invention relates to a method of manufacturing a liquid koji used in the production of fermented foods and drinks, particularly a liquid koji having an enzymatic activity required for brewing Shochu (Japanese distilled spirits).

BACKGROUND ART

As for Koji used in the production of alcoholic beverages, there are solid koji, which is cultured such that a spore of mold is inoculated into a raw material after treatment with cooking or the like and then cultivated, and a liquid koji, which is cultured such that a liquid-medium is prepared by adding a raw material and other nutrients to water, and then inoculated with spores of mold, mycelium cultured in advance or the like into the liquid medium, followed by cultivation.

In the conventional production of alcoholic beverages or fermented foods and drinks, such as sake, shochu, soy sauce, fermented soybean paste, and sweet sake, the so-called solid koji prepared by a solid culture method has been widely used. The solid culture method is a culture method by which a koji mold such as *Aspergillus kawachii, Aspergillus awamori, Aspergillus niger, Aspergillus oryzae*, or *Aspergillus sojae* is diffused on a solid raw material such as steam-cooked cereals to allow a koji mold to grow on the solid surface.

For instance, for the production of shochu, *Aspergillus kawachii, Aspergillus awamori*, and so on have been widely used. However, as the solid culture method is a culture system in which a raw material and the koji mold disperse unevenly, it is difficult to equalize factors such as temperature, water content, and various nutrients. Therefore, the culture can be very complicated to be controlled. In addition, the production of koji tends to be carried out in an open state. In this case, care should be exercised in quality control with respect to contamination with other bacteria. Therefore, it is unsuitable for a large-scale production.

In contrast, the liquid culture method is easily subjected to culture control and quality control, so that it is suitable for efficient production. However, there is a problem for example, in that a sufficient enzymatic activity required for brewing shochu is not obtained. Therefore, there are few examples in which a culture product obtained by the liquid culture of a koji mold was really used as a shochu koji. Here, the "culture product" obtained by the liquid culture method means a culture product itself obtained by the liquid culture methods (hereinafter, also referred to as a "liquid koji") as well as a culture liquid, molds, a concentrate thereof, or a dried product thereof.

A major reason for no use of the culture product obtained by the liquid culture method in the production of fermented foods and drinks such as shochu etc., is that the behavior of a koji mold to produce an enzyme such as amylase or cellulase in the liquid culture is known to be much different from one in the solid culture, and the productivity thereof is also known to be decreased overall (see Non-Patent Document 1).

Typically, in the production of alcoholic beverages including shochu, alcohol is generated by parallel fermentation of two types. Therefore, saccharolytic enzymes from a koji mold, which affect on the supply of glucose to the koji mold, particularly glucoamylase (hereinafter sometimes abbreviated as GA) and acid-stable α-amylase (hereinafter sometimes abbreviated as ASAA) are key enzymes in alcoholic fermentation. However, it is known that the activity of glucoamylase in the culture product obtained by the liquid culture method is remarkably low and the production behavior thereof is also much different from one in the solid culture (see Non-Patent Document 2).

As a method of improving the glucoamylase activity of a koji mold, there are two methods which have been reported, one cultures the koji mold while giving a stress on the growth of mycelium (see Patent Document 1) and the other adds roasted cereals to a koji mold culture medium (see Patent Document 2). The method disclosed in Patent Document 1 carries out a culture on a porous membrane or in an inclusive fixing agent having aperture to express a novel gene glaB that encodes glucoamylase, to enhance the enzymatic activities. Thus, the method requires strict control or a specific culture device and thus it is not practical. In addition, the method disclosed in Patent Document 2 is a method of cultivating a koji mold in a liquid medium using the roasted cereals as, at least, a portion of the raw material. Accordingly, said method requires an additional production step of roasting cereals.

Therefore, the inventors of the present invention offered an invention related to a method of culturing a koji mold using a liquid medium that contains hardly decomposable saccharides for the koji mold (see Patent Document 3). According to this invention, the koji mold culture product having a high activity of glycolytic enzymes such as glucoamylase, which can be used in the production of alcoholic beverages or fermented foods and drinks, can be obtained conveniently and inexpensively.

On the other hand, recently, the molecular biological analysis on acid-stable α-amylase has been started (see Non-Patent Document 3). In this case, it is reported as follows: A white koji mold has two different amylase genes which are respectively responsible for two different characteristics, acid-unstable α-amylase and acid-stable α-amylase. However, the expression behaviors of the respective genes are much different from each other. In the liquid culture, the acid-unstable α-amylase can be produced in sufficient amount, while the acid-stable α-amylase, a key enzyme for brewing shochu, is hardly produced.

In the production of shochu, it is brewed under a low-pH environment for preventing a shochu mash from putrefaction. However, the acid-unstable α-amylase does not contribute to glycolysis in shochu brewing because the acid-unstable α-amylase is deactivated promptly under low-pH conditions. Therefore, for the production of shochu, it is indispensable to produce acid-stable α-amylase with high yield, which may contribute to the glycolysis in shochu brewing, by the liquid culture of a koji mold.

In the past, there was a report in which the behavior of a koji mold in a liquid culture to produce acid-stable α-amylase was investigated. The method uses a synthetic medium containing peptone and a citrate buffer solution and requires a cultivation time of 100 hours or more. Therefore, it is hard to say to be a process of manufacturing a liquid koji applicable to the actual shochu brewing (see Non-Patent Document 4).

Patent Document 1: JP-A 11-225746
Patent Document 2: JP-A 2001-321154
Patent Document 3: JP-A 2003-265165
Non-Patent Document 1: Iwashita K. et al: Biosci. Biotechnol. Biochem., 62, 1938-1946(1998), Yuichi Yamane et al: published by Brewing Society of Japan, 99, 84-92(2004)
Non-Patent Document 2: Hata Y. et al: J. Ferment. Bioeng., 84, 532-537(1997), Hata Y. et al: Gene, 207, 127-134 (1998), Ishida H. et al: J. Ferment. Bioeng., 86, 301-307 (1998), Ishida H. et al: Curr Genet., 37, 373.-379(2000)
Non-patent Document 3: Nagamine K. et al: Biosci. Biotechnol. Biochem., 67, 2194-2202(2003)

Non-Patent Document 4: Sudo S. et al: J. Ferment. Bioeng., 76, 105-110(1993), Sudo S. et al: J. Ferment. Bioeng., 77, 483-489(1994), Shigetoshi Sudo et al: published by Brewing Society of Japan, 89, 768-774(1994)

DISCLOSURE OF THE INVENTION

Problems that the Invention is to Solve

However, in the method of Patent Document 3, a koji mold having a high glucoamylase activity is obtained by cultivating a koji mold in a liquid medium prepared by the addition of hardly decomposable saccharides but not in a normal liquid medium prepared using a raw material such as cereals etc.

In addition, a technology for obtaining a koji mold culture product having a high glucoamylase activity by cultivating a koji mold in a liquid medium has been already disclosed in the art. However, there is no technology disclosed for obtaining a liquid koji having a high activity of acid-stable α-amylase, another key enzyme in alcohol fermentation, by cultivating a koji mold in a liquid medium. The acid-stable α-amylase is generally said to be an enzyme which cannot be generated in a liquid culture and thus no liquid koji having a high activity of acid-stable α-amylase has been developed.

An object of the present invention is to provide a method of manufacturing a liquid koji by cultivating a koji mold in a liquid medium, which contains unpolished cereals as a raw material, such as cereals covered with husks or cereals having surfaces from which only husks (chaffs or the like) are removed, unprocessed beans or tubers, or certain miscellaneous cereals, but not a specific liquid medium prepared by the addition of a liquid koji used in the production of fermented foods and drinks, particularly a liquid koji having high activities of glucoamylase and acid-stable α-amylase, which can be key enzymes in alcohol fermentation for brewing shochu, to specific saccharides or the like or using a roasted raw material.

Means for Solving The Problems

As a result of concentrated study in solving the above problems, the inventors of the present invention have found that, in the manufacturing of a liquid koji used in the production of fermented foods and drinks, as described above, a liquid koji having enhanced activities of glucoamylase and acid-stable α-amylase can be manufactured by cultivating a koji mold in a liquid medium that contains, as a raw material, cereals covered with husks or cereals having surfaces from which only husks (chaffs or the like) are removed, unprocessed beans or tubers, or certain miscellaneous cereals, *amaranthus* and/or quinoa. Furthermore, the present invention has been completed by finding that the liquid koji having the enhanced enzyme activities is suitable for brewing shochu.

In other words the present invention provides the following matters.
(1) A method of manufacturing a liquid koji to be used in production of a fermented food or drink, comprises:
  cultivating a koji mold in a liquid medium that contains, as a raw material, a substance selected from the group consisting of a cereal having a surface covered with a husk; a cereal having a surface from which only a husk (e.g., a chaff) is removed; an unprocessed bean or tuber having a surface covered with a hull; and *amaranthus* and/or quinoa.
(2) A method of manufacturing a liquid koji according to (1), in which the cereal having the surface covered with the husk is unpolished or the cereal with polishing ratio equal to or more than the degree of the husk at least being remained on the surface of kernel.
(3) A method of manufacturing a liquid koji according to (1) or (2), in which the cereal is barley.
(4) A method of manufacturing a liquid koji according to (3), in which the barely has the polishing ratio of 90% or more.
(5) A method of manufacturing a liquid koji according to (1) or (2), in which the cereal is rice, wheat, buckwheat, barnyard millet, foxtail millet, millet, Kaoliang, or corn.
(6) A method of manufacturing a liquid koji according to (1), in which the cereal having the surface from which only the husk (e.g., the chaff) is removed is an unpolished rice.
(7) A method of manufacturing a liquid koji according to (1), in which the unprocessed bean or tuber having the surface covered with the hull is a soybean, a red bean, or a sweet potato.
(8) A method of manufacturing a liquid koji according to any one of (1) to (7), comprises:
  simultaneously producing and accumulating at least glucoamylase and acid-stable α-amylase in a culture product of a koji mold cultivated in a liquid medium containing the raw material.
(9) A method of manufacturing a fermented food or drink, comprises:
  producing a fermented food or drink using a liquid koji obtained by the method according to any one of (1) to (8).
(10) A method of manufacturing a fermented food or drink according to (9), in which all steps of producing a fermented food or drink are carried out in a liquid phase.
(11) A method of manufacturing a fermented food or drink according to (9) or (10), in which the production of a fermented food or drink is carried out in a liquid phase under sheltering from an outside.
(12) A method of manufacturing a fermented food or drink according to any one of (9) to (11), in which the production of a fermented food or drink is carried out by adding another raw material to the liquid koji to produce a primary mash.
(13) A method of manufacturing a fermented food or drink according to any one of (9) to (12), in which the fermented food or drink is shochu.
(14) A set of liquid koji for production of a fermented food or drink, said liquid koji having a glucoamylase activity and an acid-stable α-amylase activity obtained by a method of manufacturing a liquid koji according to any one of (1) to (8).
(15) A method of manufacturing a liquid koji according to any one of (1) to (7), wherein, in production of a liquid koji in which a koji mold is cultivated in a liquid medium containing the raw material, an enzymatic activity of a liquid koji is adjusted by suppressing a rate of releasing a saccharide derived from a starch in the raw material into a culture system.

Effects of the Invention

According to the present invention, a liquid koji in which enzymes such as glucoamylase and acid-stable α-amylase which are required in the brewing of shochu are simultaneously produced with high yield can be produced by cultivating a koji mold in a liquid medium containing various kinds of raw materials described above. According to the liquid culture, cultivation can be controlled strictly as compared with a solid culture, so that a liquid koji having stable quality can be produced cheaply and effectively.

In addition, when the liquid koji manufactured by the present invention is used, the same degree of fermentation can be attained as that of a shochu mash using the conventional solid koji. The shochu thus produced has substantially the same quality as that of shochu produced using a solid koji without organoleptic inferiority.

Besides, the raw material used in the present invention is unpolished, unprocessed, or polished to an extent in which at least an hull remains on the surface. Thus, an improvement in availability of the raw material or recovery can be expected.

In addition, when shochu is produced using the liquid koji manufactured by the present invention, it is possible to carry out all steps in a liquid phase, which is different from the conventional shochu production using a solid koji. Therefore, a shochu production system, which is effective and stable as compared with the conventional one, can be provided.

THE BEST MODE OF CARRYING OUT THE INVENTION

Figure 1:
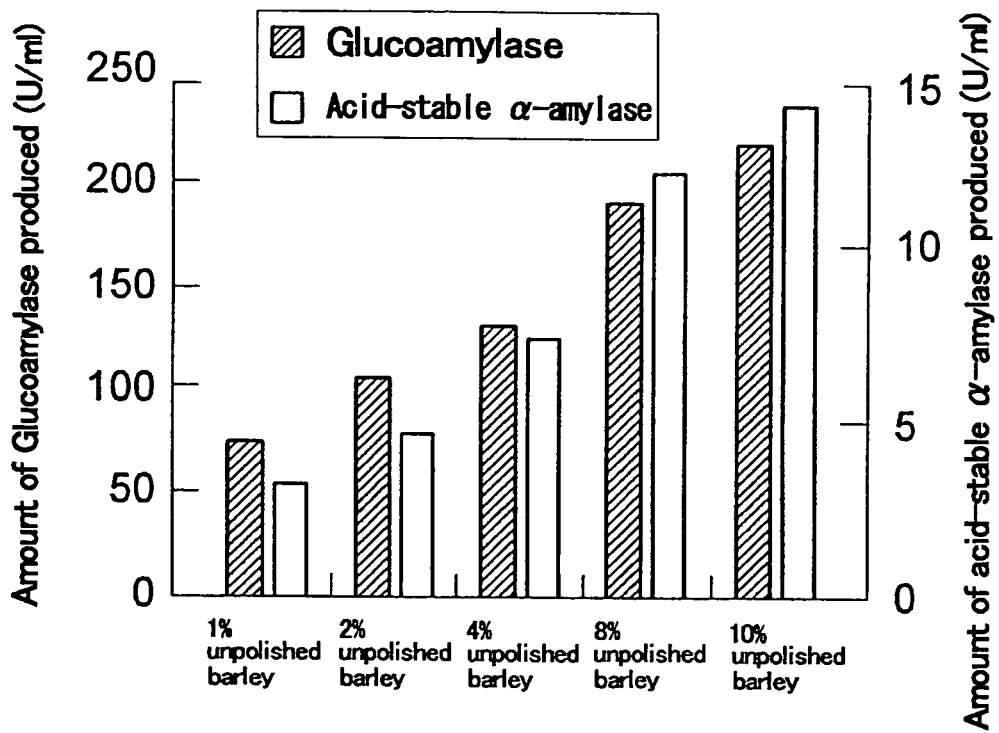
FIG. 1 is a diagram that represents the relationship between the amount of crude barley used and the amounts of glucoamylase and acid-stable α-amylase produced in a koji mold culture using a liquid medium containing unpolished barley.

Hereinafter, the present invention will be described concretely.

The method of manufacturing a liquid koji according to the present invention comprises the steps of cultivating a koji mold in a liquid medium prepared with the addition of raw materials such as cereals, beans, tubers, and certain miscellaneous cereals as described above and producing a liquid koji with enhanced enzymatic activities of glucoamylase and acid-stable α-amylase. In other words, the koji mold is cultivated using various raw materials. Thus, the saccharification of starches in the raw materials takes much time while the rate of releasing saccharides into a culture system is suppressed, resulting in an increase in enzymatic activity of a liquid koji. Besides, glucoamylase and acid-stable α-amylase are simultaneously generated and accumulated in a balanced manner.

In the present invention, the cereals used as raw materials may include barley, rice, wheat, buckwheat, barnyard millet, foxtail millet, millet, Kaoliang, and corn. Those raw materials may be configured to be unpolished products or those having certain polishing ratio equal to or more than the degree of husks at least being remained on the surface of kernels. For instance, when the cereals are barley, unpolished cereals having a polishing ratio of 100% are used or, provided that the polishing ratio of the unpolished cereals is defined as of 100%, the cereals used are those having polishing ratio determined by subtracting the ratio of the husk of barley (generally 7 to 8%) from the polishing ratio of unpolished cereals, i.e., those having polishing ratio of about 92% to 93%.

Here, the term "polishing ratio" refers to the ratio of cereals remained after polishing the cereals. For instance, the term "polishing ratio of 90%" means that 10% of the husk or the like on the surface layer portion of cereals is shaved away. In the present invention, furthermore, the term "crude barley" includes those having polishing ratio of 90% and more, from unpolished barley to polished barley having husks remained on the kernels' surfaces. In addition, the term "husk" refers to the outside part that covers the surface of a cereal particle.

The term "unpolished rice", which is a cereal used as a raw material from which only a surface husk is removed refers to a rice plant from which only chaffs are removed.

Furthermore, in the present invention, beans and tubers used as raw materials may include soybeans, red beans, and sweet potatoes. Those raw materials are only subjected to the step of washing soil out of their hulls but not subjected to any process including cutting, crushing, and so on at all.

In the present invention, *amaranthus* used as a raw material is a generic term of plants belonging to the genus *Amaranthus* of the family Amaranthaceae. Among cereals, *amaranthus* has a higher protein content and the content of lysine which is one of the amino acids is equal to that of soybeans. Besides, *amaranthus* is a nutritious cereal containing large amounts of calcium, iron, and fibers in comparison with polished rice. The countries of origin extend specific areas of South/Central American Countries, India, Himalayas, and Nepal. On the other hand, quinoa is an annual herb of Agatha family and is mainly cultivated in highlands such as the Andes located in the southern part of Peru and the western part of Bolivia. The quinoa is rich in minerals, vitamins, proteins, and dietary fibers.

*Amaranthus* and quinoa as raw materials, may be independently used or in combination. Those raw materials may be directly used in the preparation of a liquid medium without subjecting them to a pre-treatment such as grinding or crushing.

The above raw materials are mixed with water to prepare a liquid medium. The blending ratio of raw materials may be selected so as to be appropriate to selectively generate glucoamylase and acid-stable α-amylase and accumulate them during the culture of koji mold to prepare a liquid medium.

For instance, when barley is used as a raw material, a liquid medium is prepared by adding 1 to 20% (w/vol) of crude barley to water. In addition, when unpolished barley is used as crude barley, more preferably, a liquid medium with the addition of 8 to 10% (w/vol) of the crude barley is prepared. When 95%-polished barley as crude barley is used as a raw material, more preferably, a liquid medium with the addition of 1 to 4% (w/vol) of the raw material is prepared.

Next, when unpolished rice from which chaffs are removed is used as a raw material, a liquid medium with the addition of 1% (w/vol) to 20% (w/vol), preferably 5% (w/vol) to 13% (w/vol), more preferably 8% (w/vol) to 10% (w/vol) of unpolished rice to a volume of water is prepared.

When beans are used as a raw material, a liquid medium with the addition of 1 to 10% (w/vol) of beans, preferably with the addition of 8 to 10% (w/vol) of soybeans or with the addition of 1 to 2% (w/vol) of red beans to a volume of water is prepared. When tubers are used as a raw material, a liquid medium with the addition of 1 to 10% (w/vol) of tubers to a volume of water is prepared.

Next, when *amaranthus* is used as a raw material, a liquid medium with the addition of 1.5% (w/vol) to 15% (w/vol), preferably 2% (w/vol) to 10% (w/vol), more preferably 2% (w/vol) to 8% (w/vol) of *amaranthus* to a volume of water is prepared. Next, when quinoa is used as a raw material, a liquid medium with the addition of 1.5% (w/vol) to 7% (w/vol), preferably 2% (w/vol) to 6% (w/vol), more preferably 2% (w/vol) to 4% (w/vol) of quinoa to a volume of water is prepared.

In this manner, the amounts of the raw materials to be blended may be selected at will because those most suitable for the blending depend on the polishing degrees of raw materials used, the species of a koji mold used, the kind of the raw material, and so on.

A koji mold is cultivated in a liquid medium added with appropriate amounts of the above raw materials to produce high levels of enzymes, glucoamylase and acid-stable α-amylase, in a balanced manner, resulting in a liquid koji having an enzymatic activity sufficient to be used in the brewing of shochu. When the amount of the raw material used exceeds the upper limit thereof, the viscosity of a culture medium rises and the supply of oxygen or air to be required for the aerobic culture of a koji mold becomes insufficient. Thus, it is not preferable because of difficulty in progress of the cultivation due to a decrease in oxygen content of a culture product. On the other hand, when the amount of the raw material used does not satisfy the lower limit, the target enzymes cannot be produced with high yield.

Starches included in the raw material may be gelatinized before cultivation. A method of gelatinizing starches may be performed, but not particularly limited to, according to any of the conventional methods including a steaming method and a roasting method. In the step of sterilizing a liquid medium as described later, when starches are heated at a gelation temperature or higher by sterilization at high temperatures and high pressures, the gelatinization of starches can be also simultaneously carried out by such a treatment.

It is preferable to appropriately add an organic compound, an inorganic salt, or the like as a nutrient to the liquid medium in addition to the raw materials described above. Those additives are not particularly limited as far as they are generally used for cultivating a koji mold. Examples of the organic compound include rice bran, wheat bran, corn steep liquor, soybean cake, and defatted soybeans. Examples of the inorganic salt include such aqueous compounds as ammonium salt, nitrate, potassium salt, acid phosphate, calcium salt, and magnesium salt. Two or more organic compounds and/or inorganic salts may be simultaneously used. The amounts thereof added are not particularly limited as far as those amounts facilitate the growth of a koji mold. The amount of the organic compound added is preferably about 0.1 to 5% (w/vol) and the amount of the inorganic salt is preferably about 0.1 to 1% (w/vol). A liquid medium for koji mold thus obtained may be subjected to a sterilization treatment if required and the procedure of such a treatment is not particularly limited. For example, it may be a high-temperature and high-pressure sterilization method and carried out at a temperature of 121° C. for 15 minutes.

A sterilized liquid medium is cooled down to a culture temperature and then a koji mold is inoculated into the liquid medium. The koji mold used in the present invention is one capable of producing a glycolytic enzyme, preferably one capable of producing glucoamylase and capable of producing acid-stable α-amylase, and examples thereof include white koji molds typified by *Aspergillus kawachii*; black koji molds typified by *Aspergillus awamori* and *Aspergillus niger*; and yellow koji molds typified by *Aspergillus oryzae* and *Aspergillus sojae*. The conformation of the koji mold inoculated into the medium is arbitrary. A spore or a mycelium thereof can be used.

Those koji molds may be used as a single strain culture or a mixed culture with two or more homologous or heterogeneous strains. It is allowed to use either of a spore or a mycelium obtained in pre-culture. However, the mycelium is preferably used because of shorter times to be required in its logarithmic growth. The amount of a koji mold inoculated into a liquid medium is not particularly limited but the number of spores may be in the range of about $1 \times 10^4$ to $1 \times 10^6$ per ml of the liquid medium. For mycelium, about 0.1 to 10% per ml of the liquid medium is preferably inoculated.

The cultivation temperature of a koji mold is preferably 25 to 45° C., more preferably 30 to 40° C. but not particularly limited as far as it does not affect the growth. If the cultivation temperature is low, the culture tends to be contaminated with infectious microbes as the growth of the koji mold becomes slow. Thus, the cultivation time is preferably in the range of 24 to 72 hours. A cultivating apparatus may be any of those capable of carrying out liquid culture. For the koji mold, however, there is a need of carrying out aerobic culture. Thus, the cultivation should be performed under aerobic conditions in which oxygen or air can be supplied into the medium. In addition, it is preferable to stir the medium so that the raw materials, oxygen, and the koji mold can be uniformly distributed in the medium. The stirring conditions and the amount of aeration may be carried out under any of conditions so far as a culture environment is aerobically attained, and may be selected appropriately according to the cultivating apparatus, the viscosity of medium, and so on.

The cultivation carried out by the above cultivation method allows simultaneous generation of enzymes, glucoamylase, and acid-stable α-amylase, in a balanced manner, resulting in a liquid koji having an enzymatic activity to be used in the brewing of shochu. Furthermore, the liquid koji obtained in the above culture method may be a culture medium obtained by subjecting a culture product to centrifugal separation or the like, a concentrate thereof, a dried product thereof, or the like as well as a culture product itself.

The liquid koji or the like obtained by the manufacturing method of the present invention can be used in the production of alcoholic beverages or fermented foods and drinks. For instance, in the case of manufacturing sake, the liquid koji or the like may be used instead of a solid koji at the stage of preparing yeast mash or any of other mash. In the case of manufacturing shochu, the liquid koji or the like may be used instead of a solid koji at the stage of preparing mash. In the case of manufacturing soy sauce, the liquid koji or the like may be used instead of a solid koji at the stage of piling. In the case of manufacturing miso, the liquid koji or the like may be used instead of a solid koji at the stage of mashing. In the case of manufacturing sweet sake, the liquid koji or the like may be used instead of a solid koji at the stage of preparing yeast mash or any of other mash.

In addition, when the culture medium or the concentrate thereof obtained from the above liquid koji or culture product is used to produce alcoholic beverages or fermented foods and drinks, all steps may be carried out in a liquid phase. As a method of carrying out the production of alcoholic beverages in which the whole steps are carried out in a liquid phase, for instance, when the production of shochu is carried out, corn, wheat, rice, potato, sugar cane, and the like are used as other raw materials and then heated at about 80° C. to be liquefied by dissolving with a heat-resistant enzyme preparation. After that, the addition of the above liquid koji and yeast allows the mash to be subjected to alcohol fermentation and then distillated according to a method of distillation under atmospheric pressure or reduced pressure, or the like.

EXAMPLES

Although the present invention will be more fully described hereinafter with reference to Examples and so on, the present invention is not intended to be limited to these Examples and so on.

Experimental Example 1

Examination of Amount of Crude Barley Used in Production of Liquid Koji

The proportions of crude barley as a raw material were changed as shown in Table 1, and 5 liquid media were prepared. In each of the liquid media, a koji mold was cultivated to produce a liquid koji.

At first, 5 liquid media were prepared, in which crude barley was added to water supplemented with 0.2% (w/vol) potassium nitrate and 0.3% (w/vol.) potassium dihydrogenphosphate so that the amounts of the crude barley were adjusted to 1, 2, 4, 8, and 10% (w/vol). For each of the liquid media, after 100 ml of the liquid medium prepared was placed in a 500-ml baffle flask and was autoclaved, a white koji mold (*Aspergillus kawachii* IFO4308) cultured in advance in a liquid medium was inoculated so that the amount thereof was adjusted to 1% (v/vol) for the liquid medium. Incidentally, domestically produced and unpolished two-rowed barley was used as crude barley.

48-hour cultivation was then carried out at a temperature of 37° C. and a shaking speed of 100 rpm. After the completion of cultivation, each of the resulting culture products was measured for the amounts of glucoamylase and acid-stable α-amylase produced. The amounts of glucoamylase and acid-stable α-amylase produced of the culture products obtained from cultivation in the liquid media according to the amounts of crude barley used were shown in Table 1 and FIG. 1. Incidentally, a saccharification power fractional quantification kit (manufactured by Kikkoman, Japan) was used in the measurement for the enzymatic activity of glucoamylase. In addition, for measuring the enzymatic activity of acid-stable α-amylase, a method described in <Non-Patent Document 3> was slightly modified, whereby acid-unstable α-amylase was inactivated by treating the culture product with acid, and then an α-amylase measurement kit (manufactured by Kikkoman, Japan) was used to measure acid-stable α-amylase. More specifically, 1 ml of culture solution was supplemented with 9 ml of 100 mM acetic acid buffer (pH 3) and subjected to acid treatment at 37° C. for 1 hour, followed by measurement with the use of the α-amylase measurement kit (manufactured by Kikkoman, Japan).

On the other hand, for a control group, barley in which domestically produced two-rowed barley was polished so that the polishing ratio was brought up to 70% (hereinafter, referred to as polished barley) was used as a raw material. Liquid media were prepared in the same way as the experimental group and cultured under the same condition. After the completion of cultivation, each of the resulting culture products was similarly measured for the amounts of glucoamylase and acid-stable α-amylase produced. The amounts of glucoamylase and acid-stable α-amylase produced of the culture products obtained from cultivation in the liquid media according to the amounts of polished barley used were shown in Table 1 and FIG. 2.

TABLE 1

Amount of raw material used and amount of enzyme produced

| Experimental group | | | Control group | | |
|---|---|---|---|---|---|
| Amount of crude barley used | GA (U/ml) | ASAA (U/ml) | Amount of polished barley used | GA (U/ml) | ASAA (U/ml) |
| 1% | 72.4 | 3.1 | 1% | 58.8 | 1.2 |
| 2% | 101.8 | 4.5 | 2% | 102.6 | 3.4 |
| 4% | 127.1 | 7.3 | 4% | 66.2 | 4.2 |
| 8% | 187.6 | 12.0 | 8% | 17.5 | 11.2 |
| 10% | 217.3 | 14.0 | 10% | 10.3 | 10.7 |
| 16% | 201.5 | 12.3 | 16% | 10.0 | 9.7 |
| 20% | 185.3 | 10.5 | 20% | 8.8 | 8.9 |

\* GA: glucoamylase
ASAA: acid-stable α-amylase

As shown in Table 1 and FIG. 1, it was confirmed for those cultivated with the use of the crude barley that the amounts of the enzymes glucoamylase and acid-stable α-amylase produced simultaneously increased in balance with increases in the amount of crude barley used, and that the amounts of the enzymes produced were also drastically increased as compared to those in the case of using the polished barley as a control group. Particularly in the liquid medium supplemented with 10% (w/vol) crude barley, 217.3 U/ml of glucoamylase and 14.0 U/ml of acid-stable α-amylase were produced, and sufficient enzymatic activities for the use in the brewing of shochu were simultaneously obtained (for reference purposes, the values of the enzymatic activities of glucoamylase and acid-stable α-amylase required for the production of shochu are 100 U/ml or higher for glucoamylase and 10 U/ml or higher for acid-stable α-amylase).

Figure 2:
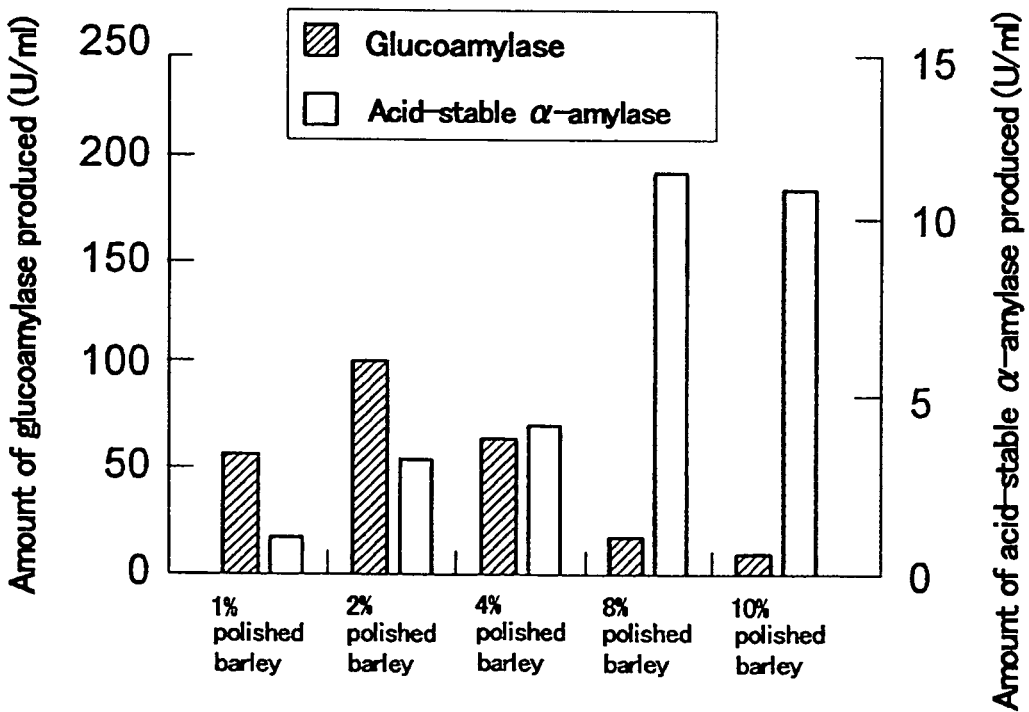
FIG. 2 is a diagram that represents the relationship between the amount of polished barley used and the amounts of glucoamylase and acid-stable α-amylase produced in a koji mold culture using a liquid medium containing polished barley.

On the other hand, for the control group with the use of the polished barley, although the glucoamylase activity was the maximum in the liquid medium supplemented with 2% (w/vol) polished barley and the acid-stable α-amylase activity was the maximum in the liquid medium supplemented with 8% (w/vol) polished barley, there was no case where both enzymes were simultaneously produced with high yield, as shown in Table 1 and FIG. 2.

As described above, a koji mold is cultivated in a liquid medium supplemented with 1 to 20% (w/vol) crude barley to thereby simultaneously produce glucoamylase and acid-stable α-amylase with high yield and in balance. In particular, the addition of 8 to 10% (w/vol) crude barley (unpolished) resulted in the production of a liquid koji in which sufficient enzymatic activities for the use in the brewing of shochu were simultaneously obtained.

The cultivation of a koji mold in a liquid medium with the use of crude barley simultaneously produces glucoamylase and acid-stable α-amylase with high yield and in balance. This probably results from the use of crude barley, the surface of which is covered with a husk, as a raw material, which reduces the release of saccharide such as glucose derived from starch in the raw material because of the husk and allows cultivation with relatively low concentration of the saccharide in the culture, so that enzymes such as glucoamylase and acid-stable α-amylase are more likely to be produced.

Example 1

Production of Liquid Koji Using Crude Barley

At first, a liquid medium was prepared, in which crude barley was added to water supplemented with 0.2% (w/vol) potassium nitrate and 0.3% (w/vol) potassium dihydrogenphosphate so that the amount of the crude barley was adjusted to 10% (w/vol). Next, after 100 ml of this liquid medium prepared was placed in a 500-ml baffle flask and was autoclaved, a white koji mold (Aspergillus kawachii IFO4308) cultured in advance in a liquid medium was inoculated so that the amount thereof was adjusted to 1% (v/vol) for the liquid medium. Incidentally, domestically produced and unpolished two-rowed barley was used as crude barley.

48-hour cultivation was then carried out at a temperature of 37° C. and a shaking speed of 100 rpm. After the completion of cultivation, when each of the resulting culture products was measured for the amounts of glucoamylase and acid-stable α-amylase produced, 217.3 U/ml of glucoamylase and 14.0 U/ml of acid-stable α-amylase were produced, and sufficient enzymatic activities for the use in the brewing of shochu were simultaneously obtained.

Example 2

Production of Barley Shochu with Liquid Koji Using Crude Barley

The liquid koji (culture product enhanced in glucoamylase and acid-stable α-amylase) obtained from cultivation in the liquid medium prepared by the addition of 10% (w/vol) crude barley in Example 1 was used to produce shochu.

That is, 500 ml of liquid koji obtained from cultivation in the liquid medium prepared by the addition of 10% (w/vol) crude barley in Example 1 was used, and 1,328.6 g of the whole barley was mashed according to the mashing combination shown in Table 2. A temperature of fermentation was kept at 25° C., and three-step mashing was carried out, in which primary, secondary, and tertiary mashing were carried out for 5, 2, and 13 days, respectively. Incidentally, as additional barley used was domestically produced two-rowed barley polished by 70% that washed with water, followed by 60-minute immersion, 30-minute drainage, and then 35-minute steaming. Because the amount of barley (50.0 g) brought about from the liquid koji was not sufficient for fermentation in the primary mashing, 262.9 g of additional barley was mashed so that the same amount of barley as that in the mashing of a solid koji was provided. A shochu yeast (Kagoshima yeast) was used as a yeast and 50 μL of shochu yeast that was statically cultured in a YPD medium at 30° C. for 48 hours was inoculated.

TABLE 2

| | Experimental group (barley liquid koji) | | | |
| --- | --- | --- | --- | --- |
| | Primary | Secondary | Tertiary | Total |
| Koji barley (g) | 50.0 | — | — | 50.0 |
| Additional barley (g) | 262.9 | 507.9 | 507.9 | 1278.6 |
| Liquid koji (ml) | 500.0 | — | — | 500.0 |
| Mashing water (mL) | 321.4 | 765.7 | 272.9 | 1360.0 |
| 90% lactic acid (mL) | 1.4 | — | — | 1.4 |

Alternatively, for control mashing (mashing with a solid koji), the koji barley of a solid koji was used to carry out the production of shochu according to the mashing combination shown in Table 3. In a method of producing the solid koji, barley polished by 70% was used and washed, followed by 40-minute immersion, 30-minute drainage, and 40-minute steaming. The resulting barley was then allowed to cool down to 40° C., and 1 g of mold starter (white koji mold; Aspergillus kawachii IFO4308) per kg of the polished barley was inoculated and cultivated at 40° C. and a relative humidity of 95% for 24 hours, at 35° C. and a relative humidity of 95% for 6 hours, and at 30° C. and a relative humidity of 90% for 18 hours. Incidentally, the condition of fermentation and so on was same as those for the above-described mashing with the present invention (mashing with a liquid koji).

TABLE 3

| | Control group (barley solid koji) | | | |
| --- | --- | --- | --- | --- |
| | Primary | Secondary | Tertiary | Total |
| Koji barley (g) | 312.9 | — | — | 312.9 |
| Additional barley (g) | — | 507.9 | 507.9 | 1015.7 |
| Mashing water (mL) | 500.0 | 765.7 | 594.3 | 1860.0 |

Figure 3:
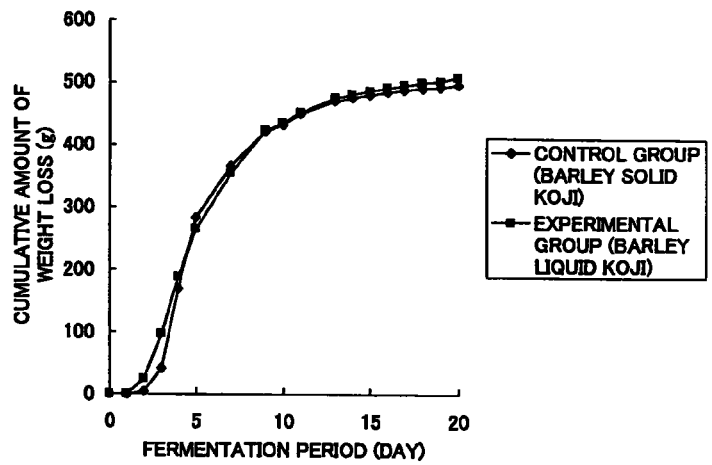
FIG. 3 is a diagram that represents the process of fermentation in the production of barley-shochu with a liquid koji using crude barley.

The progress of its fermentation was shown in FIG. 3 by comparison with that of the mashing with the solid koji as a control. As is clear from FIG. 3, the mashing with the use of the liquid koji showed the almost similar progress of fermentation as compared to that of the control mashing with the use of the solid koji. Moreover, the alcohol concentration of the obtained final mashes were the same, that is, 17.8% for both mashing with the use of the liquid koji and the solid koji.

Next, organoleptic evaluation was conducted by a scoring system (evaluation on a scale of 1 to 5; 1: good to 5: bad) by 8 panelists on shochu obtained by distilling the obtained final mashes under reduced pressure, which was added with water so that the concentration of alcohol was adjusted to 25%. The average score was shown in Table 4.

TABLE 4

| Organoleptic evaluation on shochu (percentage of alcohol: 25%) | |
| --- | --- |
| | Score |
| Mashing with the present invention (mashing with liquid koji) | 3.0 |
| Control mashing (mashing with solid koji) | 3.0 |

As a result, almost no difference in shochu quality between the two was observed, and it was confirmed that the use of a liquid koji also allows the production of shochu having the same shochu quality as that in the case of using a solid koji.

As seen in the results described above, according to the present invention, a koji mold is cultivated in a liquid medium supplemented with 1 to 20% (w/vol) crude barley to thereby simultaneously produce glucoamylase and acid-stable α-amylase in balance. In particular, the addition of 8 to 10%

(w/vol) crude barley (unpolished) resulted in the production of a liquid koji in which sufficient enzymatic activities for the use in the brewing of shochu were simultaneously obtained. Therefore, the use of this liquid koji resulted in the production of shochu having the same shochu quality as that of shochu produced using a solid koji. Furthermore, a liquid koji having high glucoamylase and acid-stable α-amylase activities can be produced in a simple liquid medium without specific culture apparatuses and strict culture control by specific culture-engineering approaches In addition, by easily carrying out particularly strict control for producing a koji in the liquid medium as compared to that of a solid culture, it became possible to stably produce a high-quality koji. Furthermore, the liquefaction of a koji allowed not only the simplification of fermentation control by the fluidization of a mash but the labor savings and efficiency of a process of production a koji, and, as a result, the labor savings and efficiency of a process of producing shochu.

Example 3

Production of Rice Shochu with Liquid Koji Using Buckwheat

1. Method of Producing Solid Koji

Rice polished by 90% was used and washed, followed by 15-minute immersion, 10-minute drainage, and 30-minute steaming. The resulting rice was then allowed to cool down to 40° C., and 1 g of mold starter (white koji mold; *Aspergillus kawachii* IFO4308) per kg of the polished rice was inoculated and cultivated at 40° C. and a relative humidity of 95% for 24 hours, at 35° C. and a relative humidity of 95% for 6 hours, and at 30° C. and a relative humidity of 90% for 18 hours.

2. Method of Producing Liquid Koji (1) Method of pre-culture; 8 g of rice polished by 90% and 100 ml of water were filled into a 500-ml baffle flask and autoclaved at 121° C. for 15 minutes. After cooling, the mold starter spores of a white koji mold (*Aspergillus kawachii* IFO4308) were inoculated at 1×10⁶/ml into the pre-culture medium and cultivated with shaking at 37° C. and 100 rpm for 24 hours.

(2) Method of main culture; 40 g of buckwheat, 1.0 g of potassium nitrate, 1.5 g of potassium dihydrogenphosphate, and 500 ml of water were filled into a 2,000-ml baffle flask and autoclaved at 121° C. for 15 minutes. Into this main culture medium, 5 ml of solution of pre-culture was inoculated and cultivated with shaking at 37° C. and 100 rpm for 48 hours to thereby produce a buckwheat liquid koji. The enzymatic activity of the liquid koji at this time was 112.4 U/ml for GA activity and 10.4 U/ml for ASAA activity.

3. Method of Producing Rice Shochu (1) Yeast used; shochu yeast (Kagoshima yeast)

(2) Mashing combination; the mashing combination was shown in Table 5 and Table 6. Rice polished by 90% was used, and the polished rice that washed, followed by 15-minute immersion, 10-minute drainage, and 30-minute steaming was used. Experimental groups are two experimental groups of 1) the mashing with a solid koji and 2) the mashing with a buckwheat liquid koji. The amounts of the whole rice and mashing water were formulated in the same quantity for both experimental groups. 50 μl of yeast statically cultured in a YPD medium at 30° C. for 48 hours was inoculated.

(3) Condition of fermentation; 25° C., constant (4) Condition of distillation; distillation under reduced pressure

TABLE 5

| | Experimental group (buckwheat liquid koji) | | | |
|---|---|---|---|---|
| | Primary | Secondary | Tertiary | Total |
| Koji buckwheat (g) | 40.0 | — | — | 40.0 |
| Additional rice (g) | 311.3 | 507.6 | 507.6 | 1326.5 |
| Mashing water (ml) | 594.0 | 765.4 | 265.6 | 1625.0 |
| Liquid koji (ml) | 500.0 | — | 0.0 | 500.0 |
| 90% lactic acid (ml) | 1.4 | — | — | 1.4 |

TABLE 6

| | Control group (solid koji) | | | |
|---|---|---|---|---|
| | Primary | Secondary | Tertiary | Total |
| Koji rice (g) | 311.3 | — | — | 311.3 |
| Additional rice (g) | — | 507.6 | 507.6 | 1015.2 |
| Mashing water (ml) | 594.0 | 765.4 | 765.6 | 2125.0 |

Figure 4:
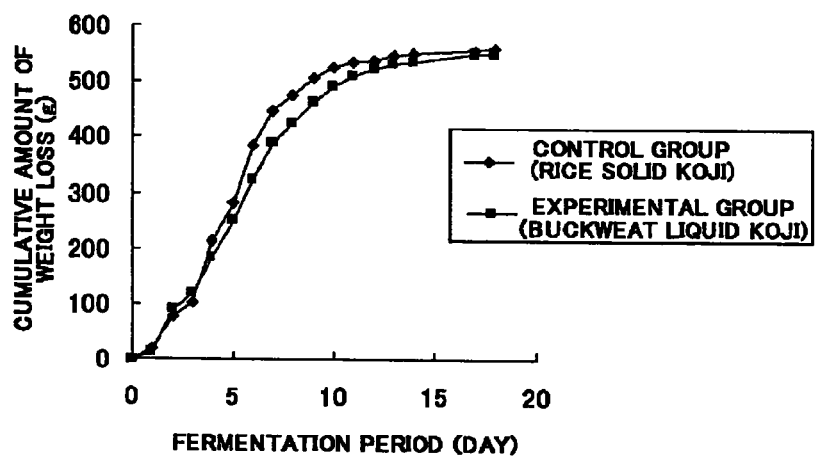
FIG. 4 is a diagram that represents the process of fermentation in the production of rice-shochu with a liquid koji using buckwheat (*Fagopyrum*).

The progress of fermentation was shown in FIG. 4 by comparison with that of the mashing with the solid koji as a control. As is clear from FIG. 4, the mashing with the use of the buckwheat liquid koji showed the almost similar progress of fermentation as compared to that of the control mashing with the use of the solid koji. Moreover, the alcohol concentration of the obtained final mashes were almost the same, that is, 19.1% and 18.9% for the mashing group with the solid koji and the mashing group with the buckwheat liquid koji, respectively.

Next, when organoleptic evaluation was conducted by a scoring system on a scale of 1 to 5 (1: good to 3 to 5: bad) by 6 expert panelists on shochu produced by distilling the obtained shochu mashes of the mashing group with the solid koji and the mashing group with the buckwheat liquid koji according to a method of distillation under reduced pressure, there was not much difference between the mashing group with the solid koji and the mashing group with the buckwheat liquid koji. This revealed that the use of the buckwheat liquid koji also allowed the production of shochu having sufficient quality. Furthermore, as shown in Table 7, the group of the buckwheat liquid koji received a comment that there were "tastes of buckwheat", and it was confirmed that the use of buckwheat liquid koji can impart a flavor of "buckwheat" to rice shochu.

TABLE 7

| | Result of organoleptic evaluation | |
|---|---|---|
| | Score (average score) | Comment |
| Solid koji | 3.0 | Gorgeous |
| Buckwheat liquid koji | 2.8 | Clear, there are tastes of buckwheat |

Example 4

Production of Rice Shochu with Liquid Koji Using Foxtail Millet

1. Method of Producing Solid Koji

Rice polished by 90% was used and washed, followed by 15-minute immersion, 10-minute drainage, and 30-minute steaming. The resulting rice was then allowed to cool down to 40° C., and 1 g of mold starter (white koji mold; *Aspergillus* kawachii IFO4308) per kg of the polished rice was inoculated and cultivated at 40° C. and a relative humidity of 95% for 24 hours, at 35° C. and a relative humidity of 95% for 6 hours, and at 30° C. and a relative humidity of 90% for 18 hours.

2. Method of Producing Liquid Koji (1) Method of pre-culture; 8 g of rice polished by 90% and 100 ml of water were filled into a 500-ml baffle flask and autoclaved at 121° C. for 15 minutes. After cooling, the mold starter spores of a white koji mold (*Aspergillus* kawachii IFO4308) were inoculated at $1 \times 10^6$/ml into the pre-culture medium and cultivated with shaking at 37° C. and 100 rpm for 24 hours.

(2) Method of main culture; 40 g of foxtail millet, 1.0 g of potassium nitrate, 1.5 g of potassium dihydrogenphosphate, and 500 ml of water were filled into a 2,000-ml baffle flask and autoclaved at 121° C. for 15 minutes. Into this main culture medium, 5 ml of solution of pre-culture was inoculated and cultivated with shaking at 37° C. and 100 rpm for 48 hours to thereby produce a foxtail millet liquid koji. The enzymatic activity of the liquid koji at this time was 101.3 U/ml for GA activity and 11.0 U/ml for ASAA activity.

3. Method of Producing Rice Shochu (1) Yeast used; shochu yeast (Kagoshima yeast)

(2) Mashing combination; the mashing combination was shown in Table 8 and Table 9. Rice polished by 90% was used, and the polished rice that washed, followed by 15-minute immersion, 10-minute drainage, and 30-minute steaming was used. Experimental groups are two experimental groups of 1) the mashing with a solid koji and 2) the mashing with a foxtail millet liquid koji. The amounts of the whole rice and mashing water were formulated in the same quantity for both experimental groups. 50 μl of yeast statically cultured in a YPD medium at 30° C. for 48 hours was inoculated.

(3) Condition of fermentation; 25° C., constant (4) Condition of distillation; distillation under reduced pressure

TABLE 8

| | Experimental group (foxtail millet liquid koji) | | | |
|---|---|---|---|---|
| | Primary | Secondary | Tertiary | Total |
| Koji foxtail millet (g) | 40.0 | — | — | 40.0 |
| Additional rice (g) | 311.3 | 507.6 | 507.6 | 1326.5 |
| Liquid koji (ml) | 500.0 | — | — | 500.0 |
| Mashing water (mL) | 594.0 | 765.4 | 265.6 | 1625.0 |
| 90% lactic acid (mL) | 1.4 | — | — | 1.4 |

TABLE 9

| | Control group (solid koji) | | | |
|---|---|---|---|---|
| | Primary | Secondary | Tertiary | Total |
| Koji rice (g) | 311.3 | — | — | 311.3 |
| Additional rice (g) | — | 507.6 | 507.6 | 1015.2 |
| Mashing water (mL) | 594.0 | 765.4 | 765.6 | 2125.0 |

Figure 5:
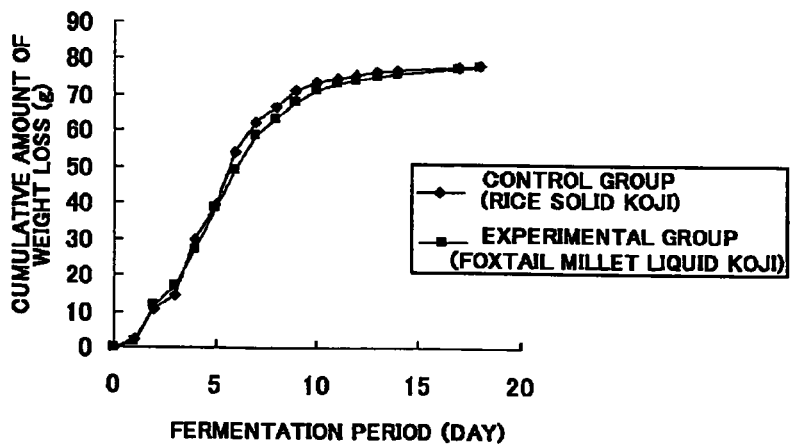
FIG. 5 is a diagram that represents the process of fermentation in the production of rice-shochu with a liquid koji using *Setaria* (foxtail millet).

The progress of fermentation was shown in FIG. 5 by comparison with that of the mashing with the solid koji as a control. As is clear from FIG. 5, the mashing with the use of the foxtail millet liquid koji showed the almost similar progress of fermentation as compared to that of the control mashing with the use of the solid koji. Moreover, the alcohol concentration of the obtained final mashes were the same, that is, 19.1% for each of the mashing group with the solid koji and the mashing group with the foxtail millet liquid koji.

Next, when organoleptic evaluation was conducted by a scoring system on a scale of 1 to 5 (1: good to 3 to 5: bad) by 6 expert panelists on shochu produced by distilling the shochu mashes of the mashing group with the solid koji and the mashing group with the foxtail millet liquid koji according to a method of distillation under reduced pressure, there was not much difference between the mashing group with the solid koji and the mashing group with the foxtail millet liquid koji. This revealed that the use of the foxtail millet liquid koji also allowed the production of shochu having sufficient quality. Furthermore, as shown in Table 10, the group of the foxtail millet liquid koji received a comment that there were "clear tastes", and the possibility of the production of rice shochu having different shochu quality from that of conventional methods of producing a solid koji was suggested.

TABLE 10

| | Result of organoleptic evaluation | |
|---|---|---|
| | Score (average score) | Comment |
| Solid koji | 3.0 | Gorgeous |
| Foxtail millet liquid koji | 3.0 | Clear |

Example 5

Production of Rice Shochu with Liquid Koji Using Barnyard Millet

1. Method of Producing Solid Koji

Rice polished by 90% was used and washed, followed by 15-minute immersion, 10-minute drainage, and 30-minute steaming. The resulting rice was then allowed to cool down to 40° C., and 1 g of mold starter (white koji mold; *Aspergillus* kawachii IFO4308) per kg of the polished rice was inoculated and cultivated at 40° C. and a relative humidity of 95% for 24 hours, at 35° C. and a relative humidity of 95% for 6 hours, and at 30° C. and a relative humidity of 90% for 18 hours.

2. Method of Producing Liquid Koji (1) Method of pre-culture; 8 g of rice polished by 90% and 100 ml of water were filled into a 500-ml baffle flask and autoclaved at 121° C. for 15 minutes. After cooling, the mold starter spores of a white koji mold (*Aspergillus* kawachii IFO4308) were inoculated at $1 \times 10^6$/ml into the pre-culture medium and cultivated with shaking at 37° C. and 100 rpm for 24 hours.

(2) Method of main culture; 40 g of barnyard millet, 1.0 g of potassium nitrate, 1.5 g of potassium dihydrogenphosphate, and 500 ml of water were filled into a 2,000-ml baffle flask and autoclaved at 121° C. for 15 minutes. Into this main culture medium, 5 ml of solution of pre-culture was inoculated and cultivated with shaking at 37° C. and 100 rpm for 48 hours to thereby produce a barnyard millet liquid koji. The enzymatic activity of the liquid koji at this time was 113.0 U/ml for GA activity and 10.2 U/ml for ASAA activity.

3. Method of Producing Rice Shochu (1) Yeast used; shochu yeast (Kagoshima yeast)

(2) Mashing combination; the mashing combination was shown in Table 11 and Table 12. Rice polished by 90% was used, and the polished rice that washed, followed by 15-minute immersion, 10-minute drainage, and 30-minute steaming was used. Experimental groups are two experimental groups of 1) the mashing with a solid koji and 2) the mashing with a barnyard millet liquid koji. The amounts of the whole rice and mashing water were formulated in the same quantity for both experimental groups. 50 μl of yeast statically cultured in a YPD medium at 30° C. for 48 hours was inoculated.

(3) Condition of fermentation; 25° C., constant (4) Condition of distillation; distillation under reduced pressure

TABLE 11

| | Experimental group (barnyard millet liquid koji) | | | |
|---|---|---|---|---|
| | Primary | Secondary | Tertiary | Total |
| Koji barnyard millet (g) | 40.0 | — | — | 40.0 |
| Additional rice (g) | 311.3 | 507.6 | 507.6 | 1326.5 |
| Liquid koji (ml) | 500.0 | — | — | 500.0 |
| Mashing water (mL) | 594.0 | 765.4 | 265.6 | 1625.0 |
| 90% lactic acid (mL) | 1.4 | — | — | 1.4 |

TABLE 12

| | Control group (solid koji) | | | |
|---|---|---|---|---|
| | Primary | Secondary | Tertiary | Total |
| Koji rice (g) | 311.3 | — | — | 311.3 |
| Additional rice (g) | — | 507.6 | 507.6 | 1015.2 |
| Mashing water (mL) | 594.0 | 765.4 | 765.6 | 2125.0 |

Figure 6:
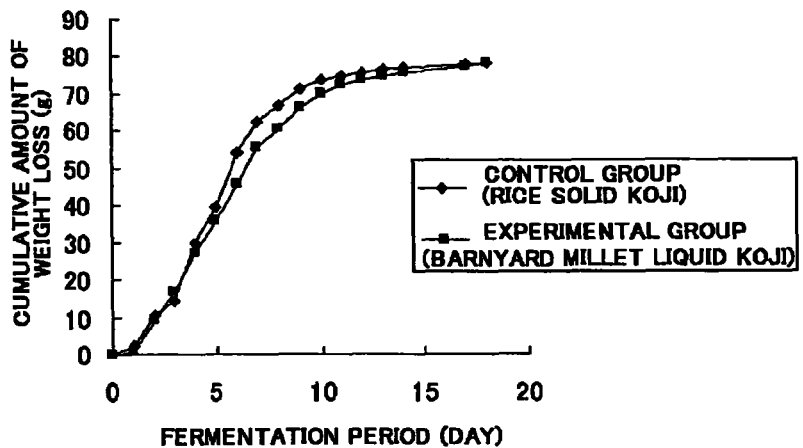
FIG. 6 is a diagram that represents the process of fermentation in the production of rice-shochu with a liquid koji using barnyard millet.

The progress of fermentation was shown in FIG. 6 by comparison with that of the mashing with the solid koji as a control. As is clear from FIG. 6, the mashing with the use of the barnyard millet liquid koji showed the almost similar progress of fermentation as compared to that of the control mashing with the use of the solid koji. Moreover, the alcohol concentration of the obtained final mashes were almost the same, that is, 19.1% and 18.8% for the mashing group with the solid koji and the mashing group with the barnyard millet liquid koji, respectively.

Next, when organoleptic evaluation was conducted by a scoring system on a scale of 1 to 5 (1: good to 3 to 5: bad) by 6 expert panelists on shochu produced by distilling the shochu mashes of the mashing group with the solid koji and the mashing group with the barnyard millet liquid koji according to a method of distillation under reduced pressure, there was not much difference between the mashing group with the solid koji and the mashing group with the barnyard millet liquid koji. This revealed that the use of the barnyard millet liquid koji also allowed the production of shochu having sufficient quality. Furthermore, as shown in Table 13, the group of the barnyard millet liquid koji received a comment that there were "clear tastes", and the possibility of the production of rice shochu having different shochu quality from that of conventional methods of producing a solid koji was suggested.

TABLE 13

| | Result of organoleptic evaluation | |
|---|---|---|
| | Score (average score) | Comment |
| Solid koji | 3.0 | Gorgeous |
| Barnyard millet liquid koji | 3.0 | Clear |

Example 6

Production of Rice Shochu with Liquid Koji Using Millet

1. Method of Producing Solid Koji

Rice polished by 90% was used and washed, followed by 15-minute immersion, 10-minute drainage, and 30-minute steaming. The resulting rice was then allowed to cool down to 40° C., and 1 g of mold starter (white koji mold; *Aspergillus kawachii* IFO4308) per kg of the polished rice was inoculated and cultivated at 40° C. and a relative humidity of 95% for 24 hours, at 35° C. and a relative humidity of 95% for 6 hours, and at 30° C. and a relative humidity of 90% for 18 hours.

2. Method of Producing Liquid Koji (1) Method of pre-culture; 8 g of rice polished by 90% and 100 ml of water were filled into a 500-ml baffle flask and autoclaved at 121° C. for 15 minutes. After cooling, the mold starter spores of a white koji mold (*Aspergillus* kawachii IFO4308) were inoculated at $1\times10^6$/ml into the pre-culture medium and cultivated with shaking at 37° C. and 100 rpm for 24 hours.

(2) Method of main culture; 40 g of millet, 1.0 g of potassium nitrate, 1.5 g of potassium dihydrogenphosphate, and 500 ml of water were filled into a 2,000-ml baffle flask and autoclaved at 121° C. for 15 minutes. Into this main culture medium, 5 ml of solution of pre-culture was inoculated and cultivated with shaking at 37° C. and 100 rpm for 48 hours to thereby produce a millet liquid koji. The enzymatic activity of the liquid koji at this time was 90.3 U/ml for GA activity and 8.5 U/ml for ASAA activity.

3. Method of Producing Rice Shochu (1) Yeast used; shochu yeast (Kagoshima yeast)

(2) Mashing combination; the mashing combination was shown in Table 14 and Table 15. Rice polished by 90% was used, and the polished rice that washed, followed by 15-minute immersion, 10-minute drainage, and 30-minute steaming was used. Experimental groups are two experimental groups of 1) the mashing with a solid koji and 2) the mashing with a millet liquid koji. The amounts of the whole rice and mashing water were formulated in the same quantity for both experimental groups. 50 μl of yeast statically cultured in a YPD medium at 30° C. for 48 hours was inoculated.

(3) Condition of fermentation; 25° C., constant (4) Condition of distillation; distillation under reduced pressure

TABLE 14

| | Experimental group (millet liquid koji) | | | |
|---|---|---|---|---|
| | Primary | Secondary | Tertiary | Total |
| Koji millet (g) | 40.0 | — | — | 40.0 |
| Additional rice (g) | 311.3 | 507.6 | 507.6 | 1326.5 |
| Liquid koji (ml) | 500.0 | — | — | 500.0 |
| Mashing water (mL) | 594.0 | 765.4 | 265.6 | 1625.0 |
| 90% lactic acid (mL) | 1.4 | — | — | 1.4 |

TABLE 15

| | Control group (solid koji) | | | |
|---|---|---|---|---|
| | Primary | Secondary | Tertiary | Total |
| Koji rice (g) | 311.3 | — | — | 311.3 |
| Additional rice (g) | — | 507.6 | 507.6 | 1015.2 |
| Mashing water (mL) | 594.0 | 765.4 | 765.6 | 2125.0 |

Figure 7:
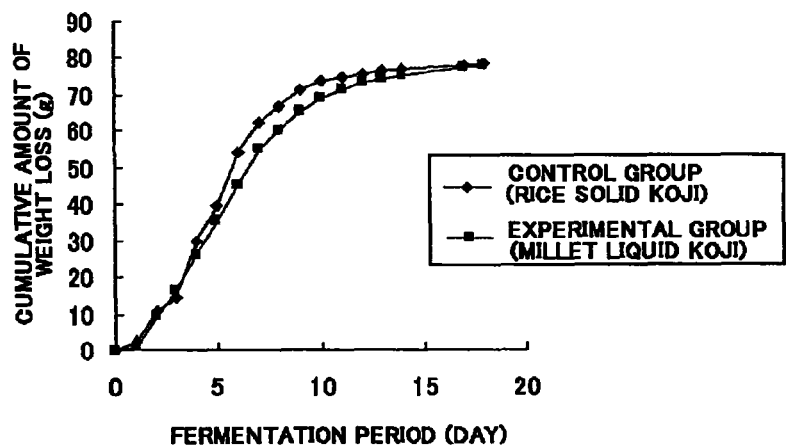
FIG. 7 is a diagram that represents the process of fermentation in the production of rice-shochu with a liquid koji using millet.

The progress of fermentation was shown in FIG. 7 by comparison with that of the mashing with the solid koji as a control. As is clear from FIG. 7, the mashing with the use of the millet liquid koji showed the almost similar progress of fermentation as compared to that of the control mashing with the use of the solid koji. Moreover, the alcohol concentration of the obtained final mashes were almost the same, that is, 19.1% and 18.8% for the mashing group with the solid koji and the mashing group with the millet liquid koji, respectively.

Next, when organoleptic evaluation was conducted by a scoring system on a scale of 1 to 5 (1: good to 3 to 5: bad) by 6 expert panelists on shochu produced by distilling the shochu mashes of the mashing group with the solid koji and the mashing group with the millet liquid koji according to a method of distillation under reduced pressure, there was not much difference between the mashing group with the solid koji and the mashing group with the millet liquid koji. This revealed that the use of the millet liquid koji also allowed the production of shochu having sufficient quality. Furthermore, as shown in Table 16, the group of the millet liquid koji received a comment that there were "mild and sweet tastes", and the possibility of the production of rice shochu having different shochu quality from that of conventional methods of producing a solid koji was suggested.

TABLE 16

Result of organoleptic evaluation

| | Score (average score) | Comment |
|---|---|---|
| Solid koji | 3.0 | Gorgeous |
| Millet liquid koji | 2.9 | Sweet, Mild |

Example 7

Production of Rice Shochu with Liquid Koji Using Kaoliang

1. Method of Producing Solid Koji

Rice polished by 90% was used and washed, followed by 15-minute immersion, 10-minute drainage, and 30-minute steaming. The resulting rice was then allowed to cool down to 40° C., and 1 g of mold starter (white koji mold; *Aspergillus kawachii* IFO4308) per kg of the polished rice was inoculated and cultivated at 40° C. and a relative humidity of 95% for 24 hours, at 35° C. and a relative humidity of 95% for 6 hours, and at 30° C. and a relative humidity of 90% for 18 hours.

2. Method of Producing Liquid Koji (1) Method of pre-culture; 8 g of rice polished by 90% and 100 ml of water were filled into a 500-ml baffle flask and autoclaved at 121° C. for 15 minutes. After cooling, the mold starter spores of a white koji mold (*Aspergillus kawachii* IFO4308) were inoculated at 1×10$^6$/ml into the pre-culture medium and cultivated with shaking at 37° C. and 100 rpm for 24 hours.

(2) Method of main culture; 40 g of Kaoliang, 11.0 g of potassium nitrate, 1.5 g of potassium dihydrogenphosphate, and 500 ml of water were filled into a 2,000-ml baffle flask and autoclaved at 121° C. for 15 minutes. Into this main culture medium, 5 ml of solution of pre-culture was inoculated and cultivated with shaking at 37° C. and 100 rpm for 48 hours to thereby produce a Kaoliang liquid koji. The enzymatic activity of the liquid koji at this time was 111.2 U/ml for GA activity and 10.5 U/ml for ASAA activity.

3. Method of Producing Rice Shochu (1) Yeast used; shochu yeast (Kagoshima yeast)

(2) Mashing combination; the mashing combination was shown in Table 17 and Table 18. Rice polished by 90% was used, and the polished rice that washed, followed by 15-minute immersion, 10-minute drainage, and 30-minute steaming was used. Experimental groups are two experimental groups of 1) the mashing with a solid koji and 2) the mashing with a Kaoliang liquid koji. The amounts of the whole rice and mashing water were formulated in the same quantity for both experimental groups. 50 μl of yeast statically cultured in a YPD medium at 30° C. for 48 hours was inoculated.

(3) Condition of fermentation; 25° C., constant (4) Condition of distillation; distillation under reduced pressure

TABLE 17

| | Experimental group (Kaoliang liquid koji) | | | |
|---|---|---|---|---|
| | Primary | Secondary | Tertiary | Total |
| Koji Kaoliang (g) | 40.0 | — | — | 40.0 |
| Additional rice (g) | 311.3 | 507.6 | 507.6 | 1326.5 |
| Liquid koji (ml) | 500.0 | — | — | 500.0 |
| Mashing water (mL) | 594.0 | 765.4 | 265.6 | 1625.0 |
| 90% lactic acid (mL) | 1.4 | — | — | 1.4 |

TABLE 18

| | Control group (solid koji) | | | |
|---|---|---|---|---|
| | Primary | Secondary | Tertiary | Total |
| Koji rice (g) | 311.3 | — | — | 311.3 |
| Additional rice (g) | — | 507.6 | 507.6 | 1015.2 |
| Mashing water (mL) | 594.0 | 765.4 | 765.6 | 2125.0 |

Figure 8:
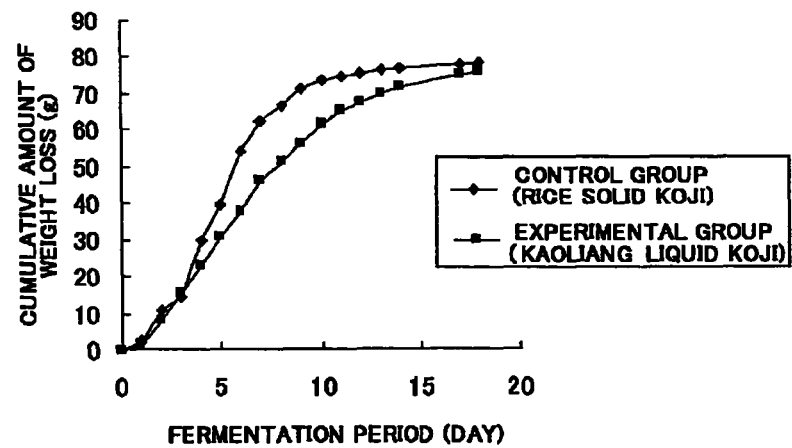
FIG. 8 is a diagram that represents the process of fermentation in the production of rice-shochu with a liquid koji using Kaoliang.

The progress of fermentation was shown in FIG. 8 by comparison with that of the mashing with the solid koji as a control. As is clear from FIG. 8, the mashing with the use of the Kaoliang liquid koji showed the almost similar progress of fermentation as compared to that of the control mashing with the use of the solid koji. Moreover, the alcohol concentration of the obtained final mashes were the same, that is, 19.1% for each of the mashing group with the solid koji and the mashing group with the Kaoliang liquid koji.

Next, when organoleptic evaluation was conducted by a scoring system on a scale of 1 to 5 (1: good to 3 to 5: bad) by 6 expert panelists on shochu produced by distilling the shochu mashes of the mashing group with the solid koji and the mashing group with the Kaoliang liquid koji according to a method of distillation under reduced pressure, there was not much difference between the mashing group with the solid koji and the mashing group with the Kaoliang liquid koji. This revealed that the use of the Kaoliang liquid koji also allowed the production of shochu having sufficient quality. Furthermore, as shown in Table 19, the group of the Kaoliang liquid koji received a comment that there was "cereal-like sweetness", and the possibility of the production of rice shochu being apparently distinguished from the conventional methods of producing a solid koji was suggested.

TABLE 19

| | Result of organoleptic evaluation | |
|---|---|---|
| | Score (average score) | Comment |
| Solid koji | 3.0 | Gorgeous |
| Kaoliang liquid koji | 3.0 | Cereal-like sweetness |

Example 8

Production of Liquid Koji Using Corn (1) Method of pre-culture: 8 g of 90% polished rice and 100 ml of water were filled in a 500-ml baffle flask and autoclaved at 121° C. for 15 minutes. After cooling, the mold starter spores of a white koji mold (*Aspergillus* kawachii IFO4308) were inoculated on the pre-culture medium so as to be $1\times10^6$/ml and then cultivated at 37° C. for 24 hours with shaking at 100 rpm.

(2) Method of main culture: 1 to 8 g of corn, 0.2 g of potassium nitrate, 0.3 g of potassium dihydrogen phosphate, and 100 ml of water were filled in a 500-ml baffle flask and autoclaved at 121° C. for 15 minutes. 1-ml of solution of pre-culture was inoculated on the main-culture medium and then cultivated at 37° C. for 48 hours with shaking at 100 rpm. The amount of enzymes generated in the supernatant of the culture after cultivation, i.e., the activity of glucoamylase (GA) and the activity of acid-stable α-amylase (ASAA) were measured by the method described in Example 1. The results are listed in Table 20.

As is evident from Table 20, in an experimental group where 4% or more of the amount of corn was used, 100 U/ml of glucoamylase, a target value of the enzymatic activity required for the brewing of shochu, was cleared. On the other hand, the target value of acid-stable α-amylase was 10 U/ml. It was confirmed that the amount of the enzyme produced tended to increase as the amount of corn used increased, even though it did not reach the target value.

As described above, in the present examination, the ASAA activity could not clear the target value thereof. However, the ability of simultaneously producing a GA enzyme and an ASAA enzyme was shown. Therefore, there is a high possibility to increase the enzyme productivity to the level of the target value by optimizing the cultivation conditions. Furthermore, for example, in the mashing of shochu using 8% corn liquid koji, it was speculated that the production of shochu was sufficiently possible if the ratio of koji was increased more than the general formulation.

TABLE 20

| | Enzymatic activity (U/ml) | |
|---|---|---|
| Amount of corn used | GA | ASAA |
| 1% | 61.9 | 1.4 |
| 2% | 66.4 | 1.7 |
| 4% | 135.7 | 3.8 |
| 8% | 114.2 | 4.2 |

Example 9

Production of Liquid Koji Using Crude Barley (1) Method of pre-culture: 8 g of 65% polished barley and 100 ml of water were filled in a 500-ml baffle flask and autoclaved at 121° C. for 15 minutes. After cooling, the mold starter spores of a black koji mold (*Aspergillus awamori* IFO4388) were inoculated on the pre-culture medium so as to be $1\times10^6$/ml and then cultivated at 37° C. for 24 hours with shaking at 100 rpm.

(2) Method of main culture: 1 to 8 g of crude barley (95% polished barley), 0.2 g of potassium nitrate, 0.3 g of potassium dihydrogen phosphate, and 100 ml of water were filled in a 500-ml baffle flask and autoclaved at 121° C. for 15 minute. 1-ml of solution of pre-culture was inoculated on the main-culture medium and then cultivated at 37° C. for 48 hours with shaking at 100 rpm. The amount of enzymes generated in the supernatant of the culture after cultivation, i.e., the activity of glucoamylase (GA) and the activity of acid-stable α-amylase (ASAA) were measured by the method described in Example 1. The results are listed in Table 21.

As is evident from Table 21, in an experimental group where 4% of the amount of crude barley was used, both 100 U/ml of glucoamylase and 10 U/ml of acid-stable α-amylase, which were target values of the enzymatic activity required for the brewing of shochu, were cleared, respectively. Therefore, even though a black koji mold was used, effects of producing the enzymes with high yield could be confirmed just as in the case of the white koji mold.

TABLE 21

| | Enzymatic activity (U/ml) | |
|---|---|---|
| Amount of crude barley used | GA | ASAA |
| 1% | 27.9 | 2.6 |
| 2% | 41.5 | 2.0 |
| 4% | 136.5 | 10.0 |
| 8% | 7.1 | 0.1 |

Example 10

Production of Liquid Koji Using Unpolished Rice (Rice with Chaffs)

(1) Method of pre-culture: 8 g of 90% polished rice (rice for eating) and 100 ml of water were filled in a 500-ml baffle flask and autoclaved at 121° C. for 15 minutes. After cooling, the mold starter spores of a white koji mold (*Aspergillus* kawachii IFO4308) were inoculated on the pre-culture medium so as to be $1\times10^6$/ml and then cultivated at 37° C. for 24 hours with shaking at 100 rpm.

(2) Method of main culture: 1 to 8 g of unpolished rice (rice with chaffs), 0.2 g of potassium nitrate, 0.3 g of potassium dihydrogen phosphate, and 100 ml of water were filled in a 500-ml baffle flask and autoclaved at 121° C. for 15 minutes. By the way, the unpolished rice used was cereals having husks (chaffs) without threshing. 1-ml of solution of pre-culture was inoculated on the main-culture medium and then cultivated at 37° C. for 48 hours with shaking at 100 rpm. The amounts of enzymes generated in the supernatant of the culture after cultivation, i.e., the activity of glucoamylase (GA) and the activity of acid-stable α-amylase (ASAA) were measured by the method described in Example 1. The results are listed in Table 22.

As is evident from Table 22, in an experimental group where 4% of the amount of unpolished rice was used, both 100 U/ml of glucoamylase and 10 U/ml of acid-stable α-amylase, which were target values of the enzymatic activity required for the brewing of shochu, were cleared, respectively. Therefore, even though the rice with husks (chaffs) was used, effects of producing the enzymes with high yield could be confirmed just as in the case of the crude barley.

TABLE 22

| Amount of unpolished rice used (rice with chaffs) | Enzymatic activity (U/ml) | |
| --- | --- | --- |
| | GA | ASAA |
| 1% | 29.2 | 0.8 |
| 2% | 39.3 | 1.8 |
| 4% | 140.4 | 11.5 |
| 8% | 89.0 | 5.2 |

Example 11

Production of Liquid Koji Using Unpolished Rice (Rice with Chaffs)

(1) Method of pre-culture: 8 g of 90% polished rice (rice for eating) and 100 ml of water were filled in a 500-ml baffle flask and autoclaved at 121° C. for 15 minutes. After cooling, the mold starter spores of a black koji mold (*Aspergillus awamori* IFO4388) were inoculated on the pre-culture medium so as to be $1\times10^6$/ml and then cultivated at 37° C. for 24 hours with shaking at 100 rpm.

(2) Method of main culture: 1 to 8 g of unpolished rice (with chaffs), 0.2 g of potassium nitrate, 0.3 g of potassium dihydrogen phosphate, and 100 ml of water were filled in a 500-ml baffle flask and autoclaved at 121° C. for 15 minutes. By the way, the unpolished rice used was cereals having husks (chaffs) without threshing. 1-ml of solution of pre-culture was inoculated on the main-culture medium and then cultivated at 37° C. for 48 hours with shaking at 100 rpm. The amounts of enzymes generated in the supernatant of the culture after cultivation, i.e., the activity of glucoamylase (GA) and the activity of acid-stable α-amylase (ASAA) were measured by the method described in Example 1. The results are listed in Table 23.

As is evident from Table 23, in an experimental group where 8% of the amount of unpolished rice was used, both 100 U/ml of glucoamylase and 10 U/ml of acid-stable α-amylase, which were target values of the enzymatic activity required for the brewing of shochu, were cleared, respectively. Therefore, even though the rice with husks (chaffs) and a black koji mold were used, effects of producing the enzymes with high yield could be confirmed.

TABLE 23

| Amount of unpolished rice used (rice with chaffs) | Enzymatic activity (U/ml) | |
| --- | --- | --- |
| | GA | ASAA |
| 1% | 14.3 | 1.4 |
| 2% | 19.3 | 1.4 |
| 4% | 40.3 | 3.9 |
| 8% | 100.0 | 10.5 |

Example 12

Production of Liquid Koji Using Unpolished Rice with No Chaffs

1. Method of Pre-Culture:

8 g of 90% polished rice and 100 ml of water were filled in a 500-ml baffle flask and autoclaved at 121° C. for 15 minutes. After cooling, the mold starter spores of a white koji mold (*Aspergillus* kawachii IFO4308) were inoculated on the pre-culture medium so as to be $1\times10^6$/ml and then cultivated at 37° C. for 24 hours with shaking at 100 rpm.

2. Method of Main Culture:

In a 500-ml baffle flask, 1 to 10 g of unpolished rice with no chaffs, 0.2 g of potassium nitrate, 0.3 g of potassium dihydrogen phosphate, and 100 ml of water were filled and autoclaved at 121° C. for 15 minutes. After cooling, 1-ml of solution of pre-culture was inoculated on the main-culture medium and then cultivated at 37° C. for 48 hours with shaking at 100 rpm.

On the other hand, as a control group, 1 to 10 g of 90% polished rice, 0.2 g of potassium nitrate, 0.3 g of potassium dihydrogen phosphate, and 100 ml of water were filled in a 500-ml baffle flask and autoclaved at 121° C. for 15 minutes. After cooling, 1-ml of solution of pre-culture was inoculated on the main-culture medium and then cultivated at 37° C. for 48 hours with shaking at 100 rpm.

After the completion of cultivation, the activity of glucoamylase (GA) and the activity of acid-stable α-amylase (ASAA) in the supernatant of each culture were measured. Incidentally, a saccharification power fractional quantification kit (manufactured by Kikkoman, Japan) was used in the measurement for the enzymatic activity of glucoamylase (GA). Alternatively, for measuring the enzymatic activity of acid-stable α-amylase (ASAA), a method described in <Non-Patent Document 3> was slightly modified, whereby acid-unstable α-amylase was inactivated by treating the culture product with acid, and then an α-amylase measurement kit (manufactured by Kikkoman, Japan) was used to measure acid-stable α-amylase. More specifically, 1 ml of culture solution was supplemented with 9 ml of 100 mM acetic acid buffer (pH 3) and subjected to acid treatment at 37° C. for 1 hour, followed by measurement with the use of the α-amylase measurement kit (manufactured by Kikkoman, Japan).

3. Results

The results are shown in Table 24. About 100 U/ml of glucoamylase and about 10 U/ml of acid-stable α-amylase are enough for the enzymatic activities required for the brewing of shochu in the study described above. When a polished rice in the control group was used, both GA and ASAA did not exceed their target values at the same time. However, when an unpolished rice in the experimental group was used, both GA and ASAA tend to be produced in a balanced manner. In particular, the use of 8% or more of unpolished rice cleared the level of the target enzymatic activity. As a result, it was indicated that the unpolished rice is suitable for the raw material of a liquid koji as compared with the polished rice.

TABLE 24

| Experimental group | | | Control group | | |
|---|---|---|---|---|---|
| Amount of unpolished rice used | Enzymatic activity(U/ml) | | Amount of polished rice used | Enzymatic activity(U/ml) | |
| | GA | ASAA | | GA | ASAA |
| 1% | 52.9 | 2.6 | 1% | 19.8 | 1.1 |
| 2% | 64.0 | 4.0 | 2% | 31.9 | 2.0 |
| 4% | 101.8 | 9.3 | 4% | 51.3 | 4.3 |
| 8% | 112.7 | 15.6 | 8% | 56.5 | 10.3 |
| 10% | 136.2 | 18.7 | 10% | 52.1 | 11.2 |

Example 13

Production of Shochu with Liquid Koji Using Unpolished Rice with No Chaffs

1. Method of Producing Solid Koji

Rice polished by 90% was used and washed, followed by 15-minute immersion, 10-minute drainage, and 30-minute steaming. The resulting rice was then allowed to cool down to 40° C., and 1 g of mold starter (white koji mold; *Aspergillus* kawachii IFO4308) per kg of the polished rice was inoculated and cultivated at 40° C. and a relative humidity of 95% for 6 hours, and at 30° C. and a relative humidity of 90% for 18 hours.

2. Method of Producing Liquid Koji (1) Method of pre-culture; 8 g of rice polished by 90% and 100 ml of water were filled into a 500-ml baffle flask and autoclaved at 121° C. for 15 minutes. After cooling, the mold starter spores of a white koji mold (*Aspergillus* kawachii IFO4308) were inoculated at $1 \times 10^6$/ml into the pre-culture medium and cultivated with shaking at 37° and 100 rpm for 24 hours.

(2) Method of main culture; In a 2,000-ml baffle flask, 40 g of unpolished rice with no chaffs, 1.0 g of potassium nitrate, 1.5 g of potassium dihydrogen phosphate, and 500 ml of water were filled and autoclaved at 121° C. for 15 minutes. 5-ml of the solution of pre-culture was inoculated on the main-culture medium and then cultivated at 37° C. for 48 hours with shaking at 100 rpm.

On the other hand, as a control group, 40 g of 90% polished rice, 1.0 g of potassium nitrate, 1.5 g of potassium dihydrogen phosphate, and 500 ml of water were filled in a 2,000-ml baffle flask and autoclaved at 121° C. for 15 minutes. 5-ml of solution of pre-culture medium was inoculated on the main-culture medium and then cultivated at 37° C. for 48 hours with shaking at 100 rpm, to produce rice liquid koji.

3. Method of Producing Rice Shochu (1) Yeast used; shochu yeast (Kagoshima yeast)

(2) Mashing combination; the mashing combination was shown in Table 25 and Table 27. Rice polished by 90% was used, and the polished rice that washed, followed by 15-minute immersion, 10-minute drainage, and 30-minute steaming was used. Experimental groups (experimental group and control group) are three experimental groups of 1) the mashing with a solid koji, 2) the mashing with an unpolished rice liquid koji, and 3) the mashing with a rice liquid koji. The amounts of the whole rice and mashing water were formulated in the same quantity for all experimental groups. 50 μl of yeast statically cultured in a YPD medium at 30° C. for 48 hours was inoculated.

(3) Condition of fermentation; 25° C., constant (4) Condition of distillation; distillation under reduced pressure

TABLE 25

| | Experimental group (unpolished rice liquid koji) | | | |
|---|---|---|---|---|
| | Primary | Secondary | Tertiary | Total |
| Koji rice (g) | 40.0 | — | — | 40.0 |
| Additional rice (g) | 271.3 | 507.6 | 507.6 | 1286.5 |
| Mashing water (ml) | 594.0 | 765.4 | 265.6 | 1625.0 |
| Liquid koji (ml) | 500.0 | — | — | 500.0 |
| 90% lactic acid (ml) | 1.4 | — | — | 1.4 |

TABLE 26

| | Control group (1) (polished rice liquid koji) | | | |
|---|---|---|---|---|
| | Primary | Secondary | Tertiary | Total |
| Koji rice (g) | 40.0 | — | — | 40.0 |
| Additional rice (g) | 271.3 | 507.6 | 507.6 | 1286.5 |
| Mashing water (ml) | 594.0 | 765.4 | 265.6 | 1625.0 |
| Liquid koji (ml) | 500.0 | — | — | 500.0 |
| 90% lactic acid (ml) | 1.4 | — | — | 1.4 |

TABLE 27

| | Control group (2) (solid koji) | | | |
|---|---|---|---|---|
| | Primary | Secondary | Tertiary | Total |
| Koji rice (g) | 311.3 | — | — | 311.3 |
| Additional rice (g) | — | 507.6 | 507.6 | 1015.2 |
| Mashing water (ml) | 594.0 | 765.4 | 765.4 | 2125.0 |

4. Results and Discussion

Figure 9:
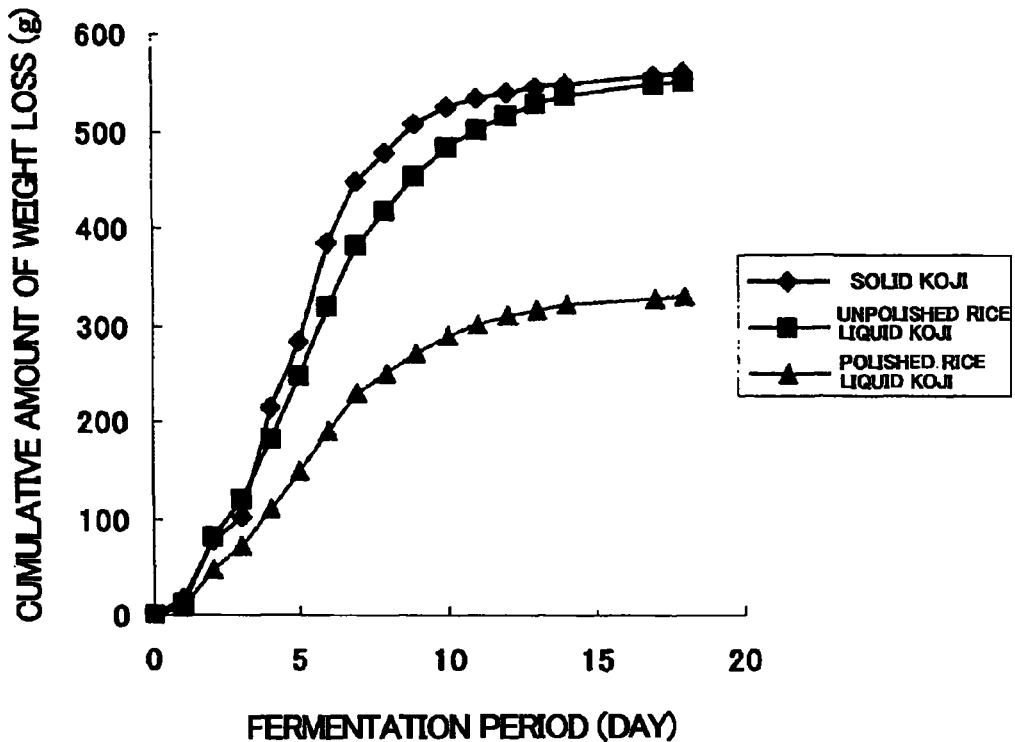
FIG. 9 is a diagram that represents the process of fermentation in the production of shochu using various kinds of koji.

The process of fermentation is shown in FIG. 9. As is evident from the figure, the mashing group with the solid koji and the mashing group with the unpolished rice liquid koji showed almost the similar process of fermentation. However, the process of fermentation of the mashing group with the polished rice liquid koji was inferior. In addition, the alcohol concentration of the obtained final mashes were almost the same, 19.1% for the mashing group with the solid koji and 18.9% for the mashing group with the unpolished rice liquid koji, respectively. In contrast, the alcohol concentration of the final mashes in the mashing group with the rice liquid koji was 12.5%, extremely lower than both of them.

Next, when organoleptic evaluation was conducted by a scoring system on a scale of 1 to 5 (1: good to 3 to 5: bad) by 6 expert panelists on shochu produced by distilling the shochu mashes of the mashing group with the solid koji and the mashing group with the unpolished rice liquid koji according to a method of distillation under reduced pressure, as shown in Table 28, there was not much difference between the mashing group with the solid koji and the mashing group with the unpolished rice liquid koji. However, the group of the liquid koji received a comment that there were "tastes of refreshing and clear". It was understood that rice shochu of refresh flavor can be obtained, and it was confirmed that the use of unpolished rice liquid koji also allows the production of rice shochu having the same quality as that of solid koji.

TABLE 28

| | Result of organoleptic evaluation | |
| --- | --- | --- |
| | Score (average score) | Comment |
| Solid koji | 3.0 | Gorgeous |
| Unpolished rice liquid koji | 2.8 | Gorgeous, Refresh, Clear |

Example 14

Production of Liquid Koji Using Unpolished Rice with No Chaffs

1. Method of Pre-Culture 8 g of 90% polished rice (rice for eating) and 100 ml of water were filled in a 500-ml baffle flask and autoclaved at 121° C. for 15 minutes. After cooling, the mold starter spores of a black koji mold (*Aspergillus awamori* IFO4388) was inoculated on the pre-culture medium so as to be 1×10$^6$/ml and then cultivated at 37° C. for 24 hours with shaking at 100 rpm.

2. Method of Main Culture 1 to 8 g of unpolished rice with no chaffs, 0.2 g of potassium nitrate, 0.3 g of potassium dihydrogen phosphate, and 100 ml of water were filled in a 500-ml baffle flask and autoclaved at 121° C. for 15 minutes. After cooling, 1-ml of solution of pre-culture was inoculated on the main-culture medium and then cultivated at 37° C. for 48 hours with shaking at 100 rpm.

After the completion of cultivation, the activity of glucoamylase (GA) and the activity of acid-stable α-amylase (ASAA) in the supernatant of the culture were measured by the method described in Example 12.

3. Results

The results are shown in Table 29. About 100 U/ml of glucoamylase and about 10 U/ml of acid-stable α-amylase may be enough for the target values of the enzymatic activities required for the brewing of shochu in the study described above. As is evident from Table 29, in the experimental group in which the amount of unpolished rice used was 8%, the activities of GA and ASAA cleared the target values, respectively. Even though a black koji mold was used, it was confirmed that an effect of producing enzymes with high yield was exerted just as in the case with the white koji mold. In addition, when the amount of unpolished rice used was further increased, the same effect of producing enzymes with high yield can be expected just as in the case with the white koji mold.

TABLE 29

| | Enzymatic activity (U/ml) | |
| --- | --- | --- |
| Amount of unpolished rice used | GA | ASAA |
| 1% | 23.0 | 0.1 |
| 2% | 33.0 | 0.2 |
| 4% | 89.0 | 8.2 |
| 8% | 132.7 | 10.6 |

Example 15

Production of Liquid Koji Using Soybean

1. Method of Pre-Culture 8 g of 90% polished rice and 100 ml of water were filled in a 500-ml baffle flask and autoclaved at 121° C. for 15 minutes. After cooling, the mold starter spores of a white koji mold (*Aspergillus* kawachii IFO4308) were inoculated on the pre-culture medium so as to be 1×10$^6$/ml and then cultivated at 37° C. for 24 hours with shaking at 100 rpm.

2. Method of Main Culture 1 to 10 g of soybeans, 0.2 g of potassium nitrate, 0.3 g of potassium dihydrogen phosphate, and 100 ml of water were filled in a 500-ml baffle flask and autoclaved at 121° C. for 15 minutes. 1-ml of solution of pre-culture was inoculated on the main-culture medium and then cultivated at 37° C. for 48 hours with shaking at 100 rpm. After cultivation, the activity of glucoamylase (GA) and the activity of acid-stable α-amylase (ASAA) in the supernatant of the culture were measured. Incidentally, a saccharification power fractional quantification kit (manufactured by Kikkoman) was used in the measurement for the enzymatic activity of glucoamylase (GA). Alternatively, for measuring the enzymatic activity of acid-stable α-amylase (ASAA), a method described in <Non-Patent Document 3> was slightly modified, whereby acid-unstable α-amylase was inactivated by treating the culture product with acid, and then an α-amylase measurement kit (manufactured by Kikkoman, Japan) was used to measure acid-stable α-amylase. More specifically, 1 ml of culture solution was added with 9 ml of 100 mM acetic acid buffer (pH 3) and subjected to acid treatment at 37° C. for 1 hour, followed by measurement with the use of the α-amylase measurement kit (manufactured by Kikkoman, Japan).

3. Results

The results are shown in Table 30. The target values of the enzymatic activities required for the brewing of shochu in the study described above are about 100 U/ml of glucoamylase and about 10 U/ml of acid-stable α-amylase. As is evident from the table, the activity of GA and the activity of ASAA increased as the amount of soybeans used increased. The use of 8% or more of soybeans cleared the target values of the enzymatic activities, respectively. Therefore, it was indicated that soybeans were suitable as a raw material.

TABLE 30

| | Enzymatic activity (U/ml) | |
| --- | --- | --- |
| Amount of soybeans used | GA | ASAA |
| 1% | 43.6 | 2.3 |
| 2% | 48.0 | 2.7 |
| 4% | 84.5 | 9.3 |
| 8% | 110.8 | 11.3 |
| 10% | 103.7 | 10.8 |

Example 16

Production of Rice Shochu with Liquid Koji Using Soybeans

1. Method of Producing Solid Koji

Rice polished by 90% was used and washed, followed by 15-minute immersion, 10-minute drainage, and 30-minute steaming. The resulting rice was then allowed to cool down to 40° C., and 1 g of mold starter (white koji mold; *Aspergillus kawachii* IFO4308) per kg of the polished rice was inoculated and cultivated at 40° C. and a relative humidity of 95% for 24 hours, at 35° C. and a relative humidity of 95% for 6 hours, and at 30° C. and a relative humidity of 90% for 18 hours.

2. Method of Producing Liquid Koji (1) Method of pre-culture; 8 g of rice polished by 90% and 100 ml of water were filled into a 500-ml baffle flask and autoclaved at 121° C. for 15 minutes. After cooling, the mold starter spores of a white koji mold (*Aspergillus* kawachii IFO4308) were inoculated at $1 \times 10^6$/ml into the pre-culture medium and cultivated with shaking at 37° and 100 rpm for 24 hours.

(2) Method of main culture; 40 g of soybeans, 1.0 g of potassium nitrate, 1.5 g of potassium dihydrogenphosphate, and 500 ml of water were filled into a 2,000-ml baffle flask and autoclaved at 121° C. for 15 minutes. Into this main culture medium, 5 ml of solution of pre-culture was inoculated and cultivated with shaking at 37° and 100 rpm for 48 hours to thereby produce a soybean liquid koji.

3. Method of Producing Rice Shochu (1) Yeast used; shochu yeast (Kagoshima yeast)

(2) Mashing combination; the mashing combination was shown in Table 31 and Table 32. Rice polished by 90% was used, and the polished rice that washed, followed by 15-minute immersion, 10-minute drainage, and 30-minute steaming was used. Experimental groups are two experimental groups of 1) the mashing with a solid koji and 2) the mashing with a soybean liquid koji. The amounts of the whole rice and mashing water were formulated in the same quantity for both experimental groups. 50 μl of yeast statically cultured in a YPD medium at 30° C. for 48 hours was inoculated.

(3) Condition of fermentation; 25° C., constant (4) Condition of distillation; distillation under reduced pressure

TABLE 31

| | Experimental group (soybean liquid koji) | | | |
| --- | --- | --- | --- | --- |
| | Primary | Secondary | Tertiary | Total |
| Koji soybeans (g) | 40.0 | — | — | 40.0 |
| Additional rice (g) | 311.3 | 507.6 | 507.6 | 1326.5 |
| Mashing water (ml) | 594.0 | 765.4 | 265.6 | 1625.0 |
| Liquid koji (ml) | 500.0 | — | — | 500.0 |
| 90% lactic acid (ml) | 1.4 | — | — | 1.4 |

TABLE 32

| | Control group (solid koji) | | | |
| --- | --- | --- | --- | --- |
| | Primary | Secondary | Tertiary | Total |
| Koji rice (g) | 311.3 | — | — | 311.3 |
| Additional rice (g) | — | 507.6 | 507.6 | 1015.2 |
| Mashing water (ml) | 594.0 | 765.4 | 765.6 | 2125.0 |

4. Results and Discussion

Figure 10:
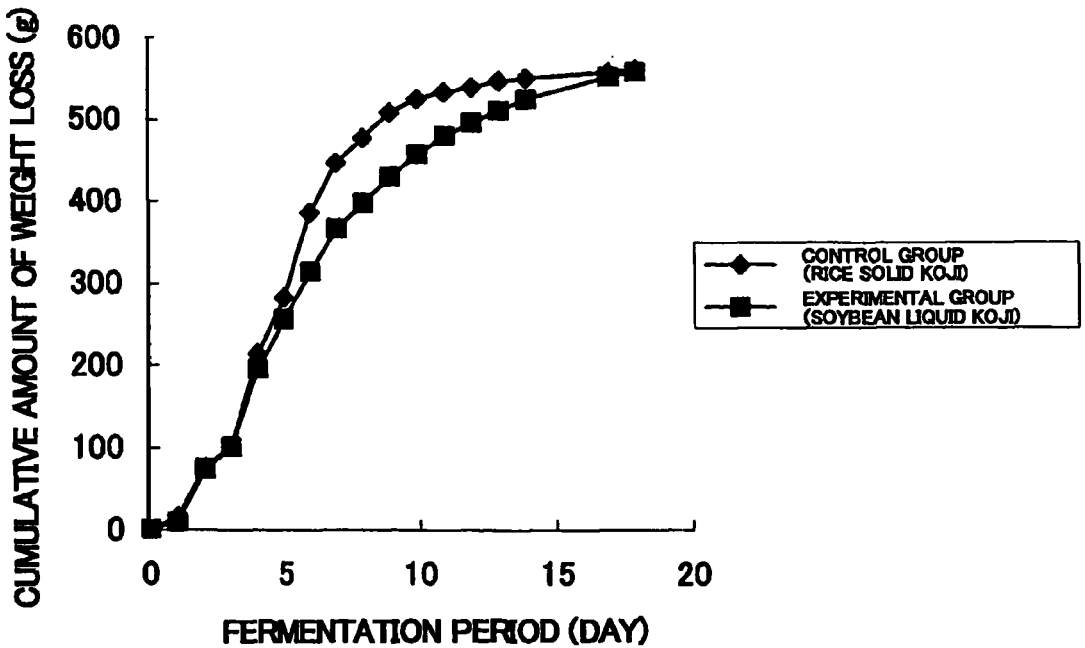
FIG. 10 is a diagram that represents the process of fermentation in the production of shochu using a liquid koji obtained from a koji mold culture with a liquid medium using soybeans.

The process of fermentation is shown in FIG. 10. As is evident from the figure, the mashing group with the rice solid koji of the control and the mashing group with the soybean liquid koji of the experimental group showed almost the similar process of fermentation. In addition, the alcohol concentration of the obtained final mashes were almost the same, 19.1% for the mashing group with the rice solid koji and 18.7% for the mashing group with the soybean liquid koji, respectively.

Next, when organoleptic evaluation was conducted by a scoring system on a scale of 1 to 5 (1: good to 3 to 5: bad) by 6 expert panelists on shochu produced by distilling the shochu mashes of the mashing group with the rice solid koji and the mashing group with the soybean liquid koji according to a method of distillation under reduced pressure, as shown in Table 33, there was not much difference between the mashing group with the rice solid koji and the mashing group with the soybean liquid koji. This revealed that the use of the soybean liquid koji also allowed the production of shochu having sufficient quality. Furthermore, the group of the soybean liquid koji received a comment that there were "gorgeous flavors", and the possibility of the production of shochu being apparently distinguished from the conventional methods of producing a solid koji was suggested.

TABLE 33

| | Result of organoleptic evaluation | |
| --- | --- | --- |
| | Score (average score) | Comment |
| Solid koji | 3.0 | Clear |
| Soybean liquid koji | 2.6 | Gorgeous, Refresh |

Example 17

Production of Liquid Koji Using Red Beans

1. Method of Pre-Culture 8 g of 90% polished rice and 100 ml of water were filled in a 500-ml baffle flask and autoclaved at 121° C. for 15 minutes. After cooling, the mold starter spores of a white koji mold (Aspergillus kawachii IFO4308) were inoculated on the pre-culture medium so as to be $1 \times 10^6$/ml and then cultivated at 37° C. for 24 hours with shaking at 100 rpm.

2. Method of Main Culture 1 to 10 g of red beans, 0.2 g of potassium nitrate, 0.3 g of potassium dihydrogen phosphate, and 100 ml of water were filled in a 500-ml baffle flask and autoclaved at 121° C. for 15 minutes. 1-ml of solution of pre-culture was inoculated on the main-culture medium and then cultivated at 37° C. for 48 hours with shaking at 100 rpm. After cultivation, the activity of glucoamylase (GA) and the activity of acid-stable α-amylase (ASAA) in the supernatant of the culture were measured by the method described in Example 15.

3. Results

The results are shown in Table 34. As described above, the target values of the enzymatic activities required for brewing of shochu are about 100 U/ml of glucoamylase and about 10 U/ml of acid-stable α-amylase. As shown in the table, each of the activity of GA and the activity of ASAA reached at maximum when the amount of red beans used was 2%, respectively. Besides, the target values of the respective enzymatic activities were cleared when the amount of the red beans used was 1 to 2%. As a result, it was indicated that red beans were suitable for the raw material of a liquid koji.

TABLE 34

| | Enzymatic activity (U/ml) | |
| --- | --- | --- |
| Amount of red beans used | GA | ASAA |
| 1% | 126.7 | 11.3 |
| 2% | 138.2 | 12.9 |

TABLE 34-continued

| Amount of red beans used | Enzymatic activity (U/ml) | |
| --- | --- | --- |
| | GA | ASAA |
| 4% | 85.4 | 10.8 |
| 8% | 67.7 | 9.4 |
| 10% | 59.0 | 8.9 |

Example 18

Production of Rice Shochu with Liquid Koji Using Red Beans

1. Method of Producing Solid Koji

Rice polished by 90% was used and washed, followed by 15-minute immersion, 10-minute drainage, and 30-minute steaming. The resulting rice was then allowed to cool down to 40° C., and 1 g of mold starter (white koji mold; *Aspergillus kawachii* IFO4308) per kg of the polished rice was inoculated and cultivated at 40° C. and a relative humidity of 95% for 24 hours, at 35° C. and a relative humidity of 95% for 6 hours, and at 30° C. and a relative humidity of 90% for 18 hours.

2. Method of Producing Liquid Koji (1) Method of pre-culture; 8 g of rice polished by 90% and 100 ml of water were filled into a 500-ml baffle flask and autoclaved at 121° C. for 15 minutes. After cooling, the mold starter spores of a white koji mold (*Aspergillus* kawachii IFO4308) were inoculated at $1\times10^6$/ml into the pre-culture medium and cultivated with shaking at 37° and 100 rpm for 24 hours.

(2) Method of main culture; 10 g of red beans, 1.0 g of potassium nitrate, 1.5 g of potassium dihydrogenphosphate, and 500 ml of water were filled into a 2,000-ml baffle flask and autoclaved at 121° C. for 15 minutes. Into this main culture medium, 5 ml of solution of pre-culture was inoculated and cultivated with shaking at 37° and 100 rpm for 48 hours to thereby produce a red bean liquid koji.

3. Method of Producing Rice Shochu (1) Yeast used; shochu yeast (Kagoshima yeast)

(2) Mashing combination; the mashing combination was shown in Table 35 and Table 36. Rice polished by 90% was used, and the polished rice that washed, followed by 15-minute immersion, 10-minute drainage, and 30-minute steaming was used. Experimental groups were two experimental groups of 1) the mashing with a solid koji and 2) the mashing with a red bean liquid koji. The amounts of the whole rice and mashing water were formulated in the same quantity for both experimental groups. 50 µl of yeast statically cultured in a YPD medium at 30° C. for 48 hours was inoculated.

(3) Condition of fermentation; 25° C., constant (4) Condition of distillation; distillation under reduced pressure

TABLE 35

| | Experimental group (red bean liquid koji) | | | |
| --- | --- | --- | --- | --- |
| | Primary | Secondary | Tertiary | Total |
| Koji red beans (g) | 10.0 | — | — | 10.0 |
| Additional rice (g) | 311.3 | 507.6 | 507.6 | 1326.5 |
| Mashing water (ml) | 594.0 | 765.4 | 265.6 | 1625.0 |
| Liquid koji (ml) | 500.0 | — | — | 500.0 |
| 90% lactic acid (ml) | 1.4 | — | — | 1.4 |

TABLE 36

| | Control group (solid koji) | | | |
| --- | --- | --- | --- | --- |
| | Primary | Secondary | Tertiary | Total |
| Koji rice (g) | 311.3 | — | — | 311.3 |
| Additional rice (g) | — | 507.6 | 507.6 | 1015.2 |
| Mashing water (ml) | 594.0 | 765.4 | 765.6 | 2125.0 |

4. Results and Discussion

Figure 11:
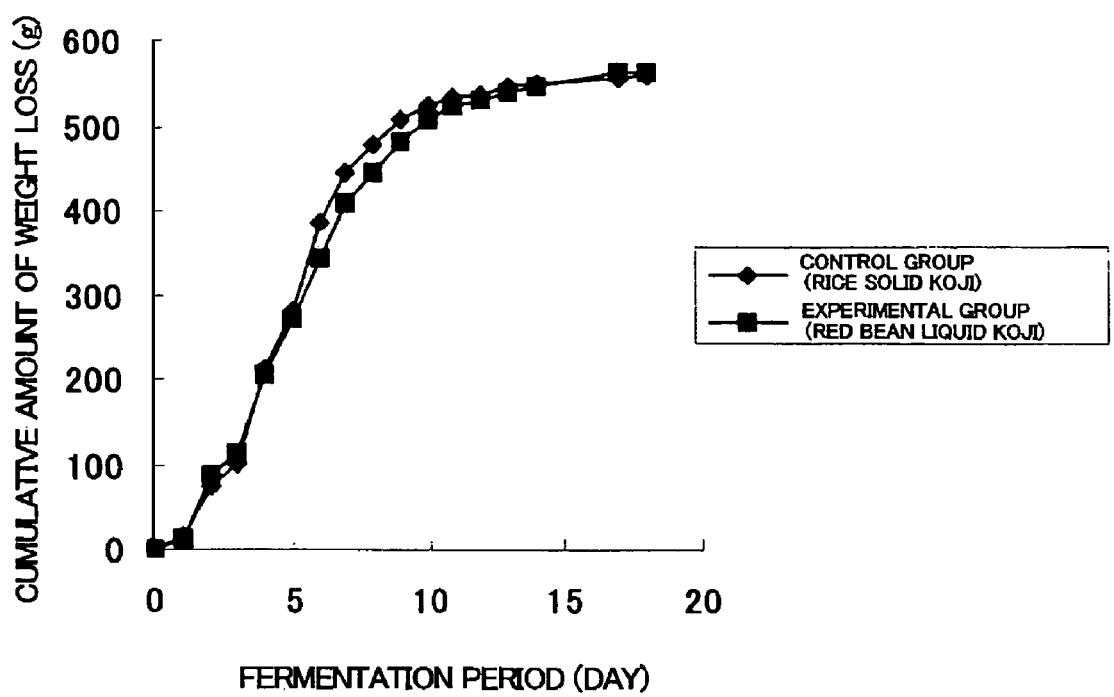
FIG. 11 is a diagram that represents the process of fermentation in the production of shochu using a liquid koji obtained from a koji mold culture with a liquid medium using red beans.

The process of fermentation is shown in FIG. 11. As is evident from the figure, the mashing group with the rice solid koji and the mashing group with the red bean liquid koji showed almost the similar process of fermentation. In addition, the alcohol concentration of the obtained final mashes were almost the same, 19.1% for the mashing group with the rice solid koji and 19.2% for the mashing group with the red bean liquid koji, respectively.

Next, when organoleptic evaluation was conducted by a scoring system on a scale of 1 to 5 (1: good to 3 to 5: bad) by 6 expert panelists on shochu produced by distilling the shochu mashes of the mashing group with the solid koji and the mashing group with the red bean liquid koji according to a method of distillation under reduced pressure, as shown in Table 37, there was not much difference between the mashing group with the solid koji and the mashing group with the red bean liquid koji. This revealed that the use of the red bean liquid koji also allowed the production of shochu having sufficient quality. Furthermore, the group of the red bean liquid koji received a comment that there were "plump tastes and sweet scent", and the possibility of the production of shochu being apparently distinguished from the conventional methods of producing a solid koji was suggested.

TABLE 37

| | Result of organoleptic evaluation | |
| --- | --- | --- |
| | Score (average score) | Comment |
| Solid koji | 3.0 | Clear |
| Red bean liquid koji | 2.8 | Plump, Red bean-like sweet scent |

Example 19

Production of Liquid Koji Using Sweet Potato

1. Method of Pre-Culture 8 g of 90% polished rice and 100 ml of water were filled in a 500-ml baffle flask and autoclaved at 121° C. for 15 minutes. After cooling, the mold starter spores of a white koji mold (*Aspergillus* kawachii IFO4308) were inoculated on the pre-culture medium so as to be $1\times10^6$/ml and then cultivated at 37° C. for 24 hours with shaking at 100 rpm.

2. Method of Main Culture

The surface of a fresh sweet potato (about 20 g) washed lightly and then, without any processing such as cutting of a calyx portion and peeling, directly filled in a 2,000-ml baffle flask together with 1.0 g of potassium nitrate, 1.5 g of potassium dihydrogen phosphate, and 500 ml of water and autoclaved at 121° C. for 15 minutes. Then, 1 ml of solution of pre-culture was inoculated on the main-culture medium and cultivated at 37° C. for 48 hours with gently stirring about 80 rpm to prevent the sweet potato to be collapsed.

The activity of glucoamylase (GA) and the activity of acid-stable α-amylase (ASAA) in the supernatant of the culture after cultivation were measured by the same method as that of Example 15.

3. Results

The results are shown in Table 38. As described above, the target values of the enzymatic activities required for the brewing of shochu described above are about 100 U/ml of glucoamylase and about 10 U/ml of acid-stable α-amylase.

As is evident from Table 38, both enzymes GA and ASAA are simultaneously produced. Even though ASAA could not clear the target value of the enzymatic activity, it is expected to increase the enzymatic activity by optimizing the culture conditions of a liquid koji, such as aeration conditions. Alternatively, even though it is a present liquid koji of sweet potatoes, the production of shochu can be sufficiently possible by increasing the ratio of koji in the preparation of shochu.

TABLE 38

|  | Enzymatic activity (U/ml) | |
| --- | --- | --- |
|  | GA | ASAA |
| Sweet Potato | 108.6 | 5.5 |

Example 20

Production of Liquid Koji Using *Amaranthus*

1. Method of Pre-Culture 8 g of 90% polished rice and 100 ml of water were filled in a 500-ml baffle flask and autoclaved at 121° C. for 15 minutes. After cooling, the mold starter spores of a white koji mold (*Aspergillus* kawachii IFO4308) were inoculated on the pre-culture medium so as to be 1×10$^6$/ml and then cultivated at 37° C. for 24 hours with shaking at 100 rpm.

2. Method of Main Culture 1 to 8 g of *amaranthus*, 0.2 g of potassium nitrate, 0.3 g of potassium dihydrogen phosphate, and 100 ml of water were filled in a 500-ml baffle flask and autoclaved at 121° C. for 15 minutes. 1-ml of solution of pre-culture was inoculated on the main-culture medium and then cultivated at 37° C. for 48 hours with shaking at 100 rpm. After cultivation, the activity of glucoamylase (GA) and the activity of acid-stable α-amylase (ASAA) in the supernatant of the culture were measured. Incidentally, a saccharification power fractional quantification kit (manufactured by Kikkoman, Japan) was used in the measurement for the enzymatic activity of glucoamylase (GA). Alternatively, for measuring the enzymatic activity of acid-stable α-amylase (ASAA), a method described in <Non-Patent Document 3> was slightly modified, whereby acid-unstable α-amylase was inactivated by treating the culture product with acid, and then an α-amylase measurement kit (manufactured by Kikkoman, Japan) was used to measure acid-stable α-amylase. More specifically, 1 ml of culture solution was added with 9 ml of 100 mM acetic acid buffer (pH 3) and subjected to acid treatment at 37° C. for 1 hour, followed by measurement with the use of the α-amylase measurement kit (manufactured by Kikkoman, Japan).

3. Results

The results are shown in Table 39. From the previous study, the target values of the enzymatic activities required for the brewing of shochu are 100 U/ml of glucoamylase and 10 U/ml of acid-stable α-amylase, respectively. As is evident from the table, the use of 2% or more of *amaranthus* cleared the target values of the enzyme activities of both enzymes, GA and ASAA, respectively. Therefore, it was indicated that *amaranthus* is useful as a raw material of liquid koji.

TABLE 39

| | Enzymatic activity (U/ml) | |
| --- | --- | --- |
| Amount of amaranthus used | GA | ASAA |
| 1% | 108.6 | 5.5 |
| 2% | 125.7 | 11.0 |
| 4% | 112.4 | 13.5 |
| 8% | 125.0 | 13.4 |

Example 21

Production of Liquid Koji Using Quinoa

1. Method of Pre-Culture 8 g of 90% polished rice and 100 ml of water were filled in a 500-ml baffle flask and autoclaved at 121° C. for 15 minutes. After cooling, the mold starter spores of a white koji mold (*Aspergillus* kawachii IFO4308) were inoculated on the pre-culture medium so as to be 1×10$^6$/ml and then cultivated at 37° C. for 24 hours with shaking at 100 rpm.

2. Method of Main Culture 1 to 8 g of quinoa, 0.2 g of potassium nitrate, 0.3 g of potassium dihydrogen phosphate, and 100 ml of water were filled in a 500-ml baffle flask and autoclaved at 121° C. for 15 minutes. 1-ml of solution of pre-culture was inoculated on the main-culture medium and then cultivated at 37° C. for 48 hours with shaking at 100 rpm. After cultivation, the activity of glucoamylase (GA) and the activity of acid-stable α-amylase (ASAA) in the supernatant of the culture were measured by the method described in Example 20.

3. Results

The results are shown in Table 40. From the previous study, the target values of the enzymatic activities required for the brewing of shochu are 100 U/ml of glucoamylase and 10 U/ml of acid-stable α-amylase, respectively. As is evident from the table, both enzymes could be produced in a balanced manner when the amount of quinoa used was 2 to 4%. Therefore, it was indicated that quinoa could be effective as a raw material of liquid koji.

TABLE 40

| | Enzymatic activity (U/ml) | |
| --- | --- | --- |
| Amount of quinoa used | GA | ASAA |
| 1% | 132.7 | 7.3 |
| 2% | 126.8 | 10.6 |
| 4% | 123.5 | 11.1 |
| 8% | 88.2 | 18.1 |

INDUSTRIAL APPLICABILITY

The present invention provides a method of manufacturing a liquid koji of stable quality cheaply and efficiently using cereals having surfaces covered with husks, cereals from which surface husks (chaffs, or the like) are removed, beans or tubers having surfaces covered with hulls, or *amaranthus* and/or quinoa of miscellaneous cereals. In addition, the liquid koji is preferable for the production of fermented foods and drinks. Besides, both enzymes glucoamylase and acid-stable α-amylase can be produced with high yield in a balanced manner. Thus, it is suitable for the production of alcoholic beverages such as shochu.

The invention claimed is:

1. A method of manufacturing a liquid koji to be used in production of a fermented food or drink, comprising cultivating a koji mold in a liquid medium that consists of (1) as a raw material, a substance selected from the group consisting of a cereal having a surface covered with a husk; a cereal having a surface from which only chaff is removed; an unprocessed bean or tuber having a surface covered with a hull; *amaranthus* and quinoa, (2) water, and (3) an inorganic salt, the raw material being mixed with the water to provide the liquid medium, wherein an amount of the raw material in the liquid medium is 1 to 20% (w/vol) when cereal is used as the raw material, 1 to 10% (w/vol) when bean or tuber is used as the raw material, 1.5 to 15% (w/vol) when *amaranthus* is used as the raw material, and 1.5 to 7% (w/vol) when quinoa is used as the raw material, wherein, in production of the liquid koji in which the koji mold is cultivated in the liquid medium containing the raw material, presence of the husk or the hull suppresses a rate of releasing a saccharide derived from starch in the raw material into a culture system including the liquid medium containing the raw material by inhibiting saccharification of the starch in the raw material, such that, during said cultivating the koji mold, at least glucoamylase and acid-stable α-amylase are both produced in a culture product of the koji mold cultivated in the liquid medium containing the raw material.

2. The method of manufacturing a liquid koji according to claim 1, wherein the cereal having the surface covered with the husk is unpolished or polished to an extent in which at least husk remains on the surface of kernels of the cereal.

3. The method of manufacturing a liquid koji according to claim 1, wherein the cereal is barley.

4. The method of manufacturing a liquid koji according to claim 3, wherein the barley has a polishing ratio of 90% or more.

5. The method of manufacturing a liquid koji according to claim 1, wherein the cereal comprises rice, wheat, buckwheat, barnyard millet, foxtail millet, millet, Kaoliang, or corn.

6. The method of manufacturing a liquid koji according to claim 1, wherein the cereal having the surface from which only the chaff is removed comprises an unpolished rice.

7. The method of manufacturing a liquid koji according to claim 1, wherein the unprocessed bean or tuber having the surface covered with the hull comprises a soybean, a red bean, or a sweet potato.

8. The method of manufacturing a liquid koji according to claim 1, wherein during said cultivating the koji mold, at least glucoamylase and acid-stable α-amylase are simultaneously produced in a culture product of the koji mold cultivated in the liquid medium containing the raw material.

9. A method of manufacturing a fermented food or drink, comprising manufacturing a liquid koji by the method according to claim 1, preparing a mash including said liquid koji, and fermenting the mash to manufacture the fermented food or drink.

10. The method of manufacturing a fermented food or drink according to claim 9, wherein the fermented food or drink is shochu.

11. A set of liquid koji for production of a fermented food or drink, said liquid koji having a glucoamylase activity and an acid-stable α-amylase activity and obtained by a method of manufacturing a liquid koji according to claim 1.

12. The method of manufacturing a liquid koji according to claim 1, wherein the cereal has a polishing ratio of 90% or more.

13. The method of manufacturing a liquid koji according to claim 1, wherein the cereal is rice.

14. The method of manufacturing a liquid koji according to claim 1, wherein the raw material is a polished cereal having a polishing ratio of at least 92%.

15. The method of manufacturing a liquid koji according to claim 1, wherein the raw material is a tuber having a surface covered with a hull.

16. The method of manufacturing a liquid koji according to claim 15, wherein said tuber having a surface covered with a hull is a sweet potato having a surface covered with a hull.

* * * * *